(12) United States Patent
Nagasato

(10) Patent No.: US 6,181,670 B1
(45) Date of Patent: Jan. 30, 2001

(54) OBJECTIVE LENS MOUNTING APPARATUS AND OBJECTIVE LENS DRIVING APPARATUS

(75) Inventor: Makoto Nagasato, Kanagawa-ken (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/017,481

(22) Filed: Feb. 2, 1998

(30) Foreign Application Priority Data

Jan. 31, 1997 (JP) .................................. 9-019302

(51) Int. Cl.$^7$ .................................. G11B 17/00
(52) U.S. Cl. .................................. 369/244
(58) Field of Search .................................. 369/244, 247, 369/44.11, 44.12, 44.14, 44.15, 44.18, 44.21

(56) References Cited

U.S. PATENT DOCUMENTS

| | | | |
|---|---|---|---|
| 5,126,983 | * 6/1992 | Ikegame et al. | 369/44.14 |
| 5,150,343 | * 9/1992 | Goto et al. | 369/44.14 |
| 5,216,648 | * 6/1993 | Noda et al. | 369/44.14 |
| 5,241,528 | * 8/1993 | Mohri et al. | 369/247 |
| 5,285,434 | * 2/1994 | Kim et al. | 369/44.14 |
| 5,305,151 | * 4/1994 | Kakimoto et al. | 369/44.22 |
| 5,359,459 | * 10/1994 | Kim | 369/44.14 |
| 5,408,451 | * 4/1995 | Noda et al. | 369/44.15 |
| 5,500,771 | * 3/1996 | Tomiyama | 369/44.15 |
| 5,566,149 | * 10/1996 | Song | 369/44.22 |
| 5,598,397 | * 1/1997 | Sim | 369/244 |
| 5,724,197 | * 3/1998 | Barnes et al. | 369/44.15 |
| 5,926,327 | * 7/1999 | Bae | 369/44.15 |
| 5,933,405 | * 8/1999 | Song | 369/244 |

FOREIGN PATENT DOCUMENTS

| | | |
|---|---|---|
| 6-162540 | 6/1994 | (JP) . |
| 7-65397 | 8/1995 | (JP) . |

* cited by examiner

*Primary Examiner*—Allen T. Cao
(74) *Attorney, Agent, or Firm*—Pillsbury Madison & Sutro LLP

(57) ABSTRACT

An objective lens driving device is capable of efficiently and quickly correcting the tilt of an objective lens relative to a signal recording surface of an optical disk so that comatic aberration of a spot of a light beam formed on the signal recording surface of the optical disk is reduced. The objective lens driving device for driving an objective lens (1) supported on a support block (6) supports the objective lens (1) by a support device (110) having a pair of support members (122, 124) disposed in a plane (120) perpendicular to the optical axis (1*a*) of the objective lens (1). First parts (122*a*, 124*a*) of the pair of support members (122, 124) are fixed to a lens holder (2) holding the objective lens (1), and second parts (122*b*, 124*b*) are fixed to the support block (6). The rigidity, which represent the degree of difficulty in turning the objective lens (1) about an axis perpendicular to the optical axis (1*a*) of the objective lens (1) and longitudinal axis of the support member (122, 124), of the first part (122*a*, 124*a*) of each support member (122, 124) is lower than that of the second part (122*b*, 124*b*) of the same support member (122, 124) connected to the support block (6).

12 Claims, 29 Drawing Sheets

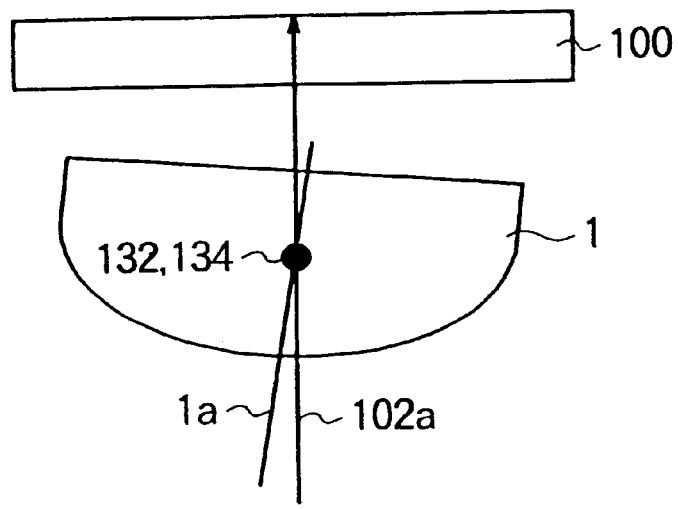
F I G. 5(a)
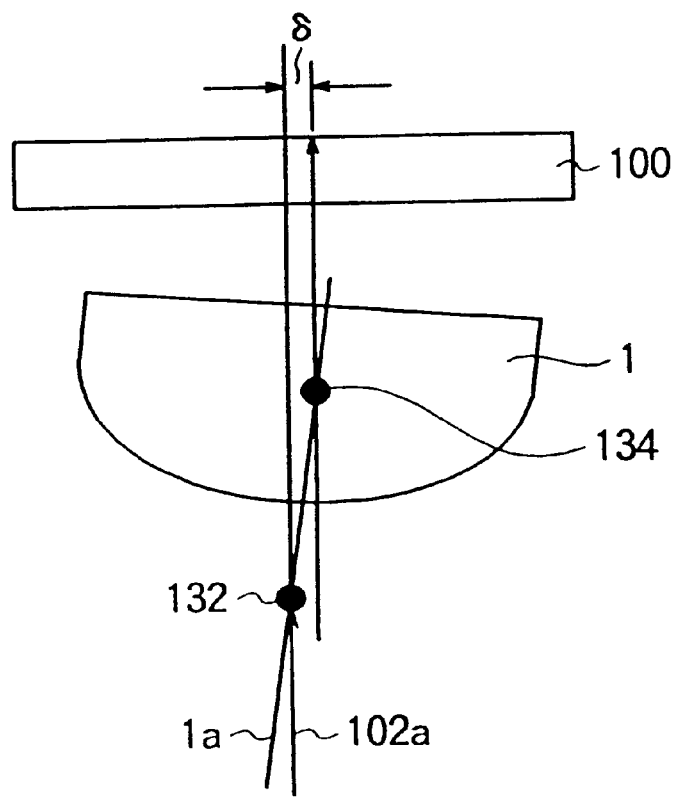
F I G. 5(b)

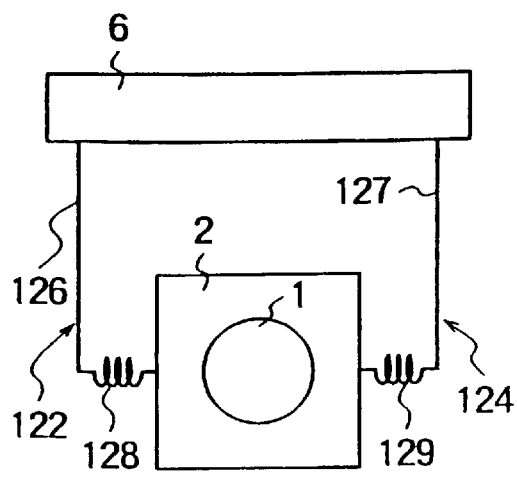
F I G. 32(a)
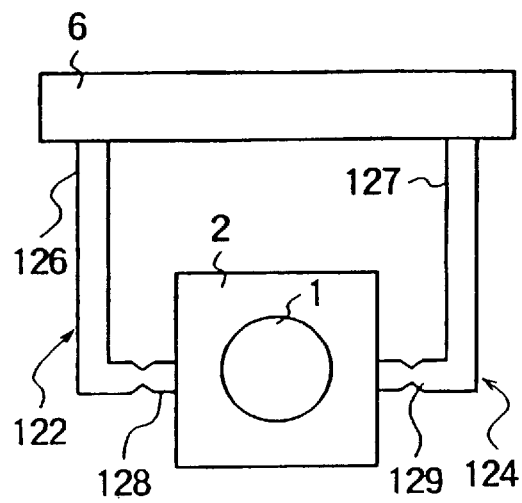
F I G. 32(b)
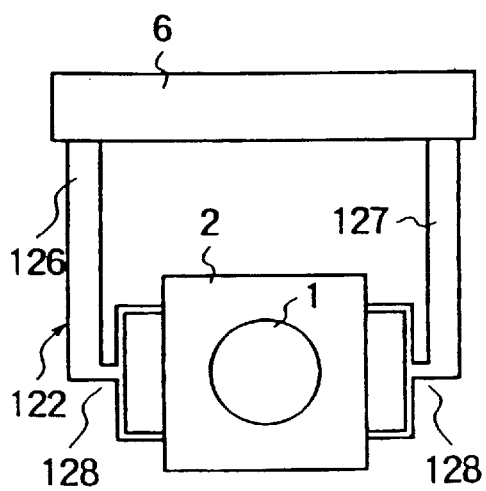
F I G. 32(c)
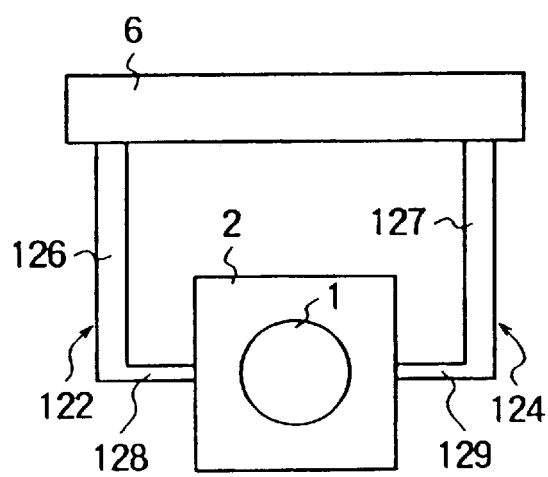
F I G. 32(d)

OBJECTIVE LENS MOUNTING APPARATUS AND OBJECTIVE LENS DRIVING APPARATUS

BACKGROUND OF THE INVENTION

1. Field of the Invention

The present invention relates to an optical information recording/reproducing apparatus capable of recording information signals on an optical recording medium, such as an optical disk and/or reproducing information signals from the optical recording medium and, more particularly, to an objective lens driving device capable of efficiently and quickly correcting the tilt of an objective lens relative to a signal recording surface of an optical disk so that comatic aberration of a spot of a light beam formed on the signal recording surface of the optical disk is reduced, and an objective lens support device.

2. Description of the Related Art

An optical disk drive, namely an apparatus which projects a light beam on the signal recording surface of a rotating optical disk to read information signals recorded on the optical disk or to write information signals to the optical disk, employs an optical head as a means for writing (recording) and reading (reproducing) information signals. The optical head comprises, as principal components, a light source, such as a semiconductor laser, optical elements including a collimator lens, a beam splitter, an objective lens and a photodetector. A light beam emitted by the light source is guided by the optical elements including the collimator lens and the beam splitter to the objective lens, the objective lens focuses the light beam on the recording surface of the optical disk, a light beam reflected from the recording surface is detected by the photodetector for recording and reproducing information signals.

An objective lens driving device drives the objective lens by an electromagnetic driving force to move the objective lens in directions parallel to two axes, i.e., a direction parallel to the axis of the light beam (focusing direction), which will be referred to as "beam axis", and a direction perpendicular to the beam axis (tracking direction). Thus, the light beam is focused on the recording surface of the optical disk and is moved correctly for scanning recording tracks.

In either an integrated optical head integrally provided with an optical system or a sectional optical head having a fixed optical system and a movable objective lens, an objective lens driving device is able to move the objective lens by about ±0.6 mm along the focusing direction and about ±0.4 mm along the tracking direction.

Generally, optical disks are resin moldings of a polycarbonate resin or an acrylic resin and a subject to static warping after being molded. If the optical disk has a warp, pit surfaces slope and thereby a reflected light beam travels at an angle to a projected light beam. Therefore, if the angle between the reflected light beam and the projected light beam exceeds an allowable limit, the reflected light beam falls outside the field of the objective lens and hence an output corresponding to the intensity of the reflected light beam is reduced. If the pit surface slopes, a working track pitch between the adjacent tracks is reduced accordingly. Accordingly, if the diameter of a beam spot formed on the pit surface is fixed, information reproduced from pits of a track is liable to be affected by information recorded on pits of an adjacent track and the intensity of crosstalk increases.

A known reproducing apparatus proposed to prevent the deterioration of reproducing performance is provided with a tilt regulating servomechanism which turns an optical system including an objective lens in a plane including the objective lens according to the static warp of an optical disk so that the optical axis of the objective lens is always perpendicular to the pit surface. The reproducing apparatus provided with such a tilt regulating servomechanism is able to regulate the tilt of the objective lens only according to a static warp.

An optical disk drive disclosed in JP-A No. 7-65397 (cited reference) is capable of preventing the deterioration of signal quality due to the tilt of the beam axis of a light beam relative to the recording surface of an optical disk and of quickly correcting the tilt of the beam axis of the light beam relative to the recording surface of the optical disk varying according to the variation of the warp of the optical disk in one turn of the optical disk. In the optical disk drive disclosed in this cited reference, an objective lens holder holding an objective lens is supported by four flexible wires so that the objective lens holder can be turned in the directions of the focusing direction, the tracking direction and a direction in which the optical axis of the objective lens is tilted. A plurality of coils for focusing, tracking and tilting are attached to the objective lens holder.

Such a mechanism of a four-wire actuator system shown in the cited reference inevitably increases the dimensions of the objective lens lens holder, i.e., a movable unit, and hence an objective lens driving device cannot be formed in a small thickness. In the mechanism of a four-wire actuator system shown in the cited reference, the center of radial tilt turning of the objective lens holder and the center of tangential tilt turning are dislocated greatly from the principal point of the objective lens. Therefore, the objective lens is dislocated from the beam axis of the incident light beam in proportion to the distance between the center of turning of the objective lens holder and the objective lens if the objective lens moves in the tilting direction of the beam axis of the light beam.

In the mechanism of a four-wire actuator system shown in the cited reference, it is impossible to make the center of gravity of the objective lens holder and the center of tangential tilting of the objective lens holder coincide with each other, cross action resonance is liable to occur and auxiliary resonance occurs in frequency characteristics with respect to the directions of actions of the actuator.

Furthermore, the mechanism of a four-wire actuator system shown in the cited reference needs an additional damping mechanism for attenuating the amplitude level of the auxiliary resonance occurred in frequency characteristics with respect to the directions of actions of the actuator, which makes the miniaturization of the objective lens driving device and the reduction of the cost of the objective lens driving device difficult.

SUMMARY OF THE INVENTION

Accordingly, it is an object of the present invention to solve the foregoing problems in the prior art and to provide an objective lens driving device capable of efficiently and quickly correcting the tilt of an objective lens relative to a signal recording surface of an optical disk so that comatic aberration of a spot formed by a light beam on the signal recording surface of the optical disk is reduced, and an objective lens support device.

With the foregoing object in view, according to one aspect of the present invention, an objective lens support device comprises an objective lens, and a pair of support members supporting the objective lens. The pair of support members are disposed in a plane perpendicular to an optical axis of the objective lens, each of the pair of support members has a first part connected to the objective lens and a second part connected to a support block, the rigidity, which represent the degree of difficulty in turning the objective lens about an axis perpendicular to the optical axis of the objective lens and the longitudinal axis of the support member, of the first part connected to the objective lens is lower than that of the second part of the same support member connected to the support block.

Since the pair of support members are disposed in a plane perpendicular to the optical axis of the objective lens, the objective lens can be easily held by the pair of support members so that the center of turning motion for tilt correction coincides with the center of gravity of a movable body and the back principal point of the objective lens. Since the rigidity of the first part of each of the pair of support members is lower than that of the second part of the same support member, the objective lens can be supported so that tilt correction with respect to the tangential tilt direction or the radial tilt direction can be carried out separately from translation in the focusing direction and the tracking direction.

According to another aspect of the present invention, an objective lens driving device comprises an objective lens, a pair of support members supporting the objective lens, and a driving means for driving the objective lens. The pair of support members are disposed in a plane perpendicular to an optical axis of the objective lens, each of the pair of support members has a first part connected to the objective lens and a second part connected to a support block, the rigidity, which represents the degree of difficulty in turning the objective lens about an axis perpendicular to the optical axis of the objective lens and the longitudinal axis of the support member, of the first part connected to the objective lens is lower than that of the second part connected to the support block.

Since the pair of support members is disposed in a plane perpendicular to the optical axis of the objective lens, the objective lens can be easily held by the pair of support members so that the center of turning motion for tilt correction coincides with the center of gravity of a movable body and the back principal point of the objective lens. Since the rigidity of the first part of each of the pair of support members is lower than that of the second part of the same, the objective lens can be supported so that operations for controlling tilt correction with respect to the tangential tilt direction or the radial tilt direction can be carried out separately from operations for controlling driving operation for translation in the focusing direction and the tracking direction.

The first part of each of the pair of support members may be a member having a rigidity lower than that of a member serving as the second part of the same.

The first part of each of the pair of support members may be an elastic member made of silicone rubber or the like, and the second part of the same may be a flexible member, such as a metal wire.

The first part of each of the pair of support members may be an elastic member made of silicone rubber or the like, and the second part of the same may be a flexible composite member consisting of an elastic member, such as a silicone rubber member, and flexible members, such as metal wires.

Each of the pair of support members may have a first bar-shaped member forming the second part and extended from the support block, and a second bar-shaped member forming the first part and having an end connected to an end of the first bar-shaped member.

The first and the second bar-shaped member may be connected so as to extend perpendicularly to each other.

The rigidity of the first part of each of the pair of support members may be lower by three or more orders of magnitude than that of the second part.

The objective lens may be held on a lens holder and the first parts of the pair of support members may be fixed to the lens holder to hold the objective lens through the lens holder by the pair of support members.

The driving means may be of a moving magnet type having magnets attached to the lens holder, and a coil attached to the support block.

The driving means may be of a moving coil type having magnets attached to the support block, and coils attached to the lens holder.

The center of gravity of a movable unit including at least the objective lens may be on the optical axis of the objective lens and included in the plane. According to the present invention, adverse resonance, such as cross action resonance attributable to the turning motion of the objective lens lens, can be prevented, and a satisfactory frequency characteristics can be secured.

The movable unit including the objective lens, the lens holder and the plurality of magnets is movable relative to the support block and may have its center of gravity on the optical axis of and in a plane with the objective lens. The driving means of the moving magnet type including the lens holder according to the present invention is able to prevent adverse resonance, such as cross action resonance, and to secure satisfactory frequency characteristics.

The movable unit including the objective lens, the lens holder and the plurality of coils and movable relative to the fixed member may be on the plane and have its center of gravity on the optical axis of the objective lens. The driving means of the moving coil type including the lens holder is able to prevent adverse resonance, such as cross action resonance, and to secure satisfactory frequency characteristics.

The driving means may be capable of turning the objective lens about two axes perpendicular to each other and included in the plane perpendicular to the optical axis of the objective lens.

The plane perpendicular to the optical axis of the objective lens may include a point substantially fixed regardless of the turning motion of the objective lens. According to the present invention, adverse resonance, such as cross action resonance attributable to the turning motion of the objective lens, can be prevented and satisfactory frequency characteristics can be secured.

The plane perpendicular to the optical axis of the objective lens may coincide substantially with the principal plane of the objective lens lens. According to the present invention, the objective lens lens can be held by the pair of support members so that the displacement and the comatic aberration of the spot of the light beam on the signal recording surface of the optical disk are reduced.

The center of turning motion of the objective lens may be on the plane and the optical axis of the objective lens. According to the present invention, adverse resonance, such as cross action resonance attributable to the turning motion of the objective lens can be prevented and satisfactory frequency characteristics can be secured.

The center of turning motion of the objective lens may coincide substantially with the center of gravity of a movable unit including the objective lens and capable of moving relative to the support block. According to the present invention, adverse resonance, such as cross action resonance attributable to the turning motion of the objective lens lens, can be prevented, and satisfactory frequency characteristics can be secured.

The center of turning motion of the objective lens may coincide substantially with the back principal point of the objective lens. According to the present invention, the displacement and the comatic aberration of the spot of the light beam on the signal recording surface of the optical disk can be reduced, tilt correction can be achieved high accuracy, and crosstalk can be avoided.

The driving means may comprise an electromagnetic driving element and a magnetic block may be disposed in a magnetic path defined by the electromagnetic driving element. According to the present invention, the objective lens can be quickly and surely returned to its neutral position by the magnetic driving element.

The support member may have a first bar-shaped member connected to the support block, and a second bar-shaped member connected to the objective lens and the first bar-shaped member, and the magnetism of the magnetic blocks may be exerted on the first bar-shaped members so that the first bar-shaped members are extended substantially longitudinally. According to the present invention, the objective lens can be stably held by the pair of support members.

The plurality of magnets may be magnetized in a direction in which the second parts of the support members are extended from the support block. According to the present invention, the objective lens can be stably held by the pair of support members.

The objective lens may be held by a lens holder having the shape of a flat plate, the lens holder may be disposed so that its thickness, i.e., a dimension along the optical axis of the objective lens, is bisected by the plane. According to the present invention, the lens holder can be stably held by the support members so that the lens holder may not produce any unnecessary torque.

The objective lens may be held on a lens holder having the shape of a flat plate, and the lens holder may be disposed so that the middle point of the thickness, i.e., a dimension along the optical axis of the objective lens, of the objective lens coincides with the back principal point of the objective lens. According to the present invention, the center of turning of the movable unit and the back principal point of the objective lens can be made to coincide stably with each other.

The present invention will be outlined with reference to FIGS. 6(a) to 6(f).

FIG. 6(a) shows a state where a disk 100 is not warped relative to the beam axis 102a of a light beam 102 incident on an objective lens 1, and FIG. 6(b) shows a state where the light beam 102 is focused in a spot by the objective lens 1 on only a single bit 100a and the spot does not overlap the adjacent bits 100b in the state shown in FIG. 6(a).

FIG. 6(c) shows a state where the disk 100 is warped relative to the beam axis 102a of the light beam 102 incident on the objective lens 1, and FIG. 6(d) shows a state where the light beam 102 is focused in a spot by the objective lens 1 on a bit 100a and an adjacent bit 100b because the tilt of the objective lens 1 relative to the disk 100 is not corrected.

FIG. 6(e) shows a state where the disk 100 is warped relative to the beam axis 102a of the light beam 102, and the position of the objective lens 1 is changed for tilt correction by an objective lens driving device of the present invention. FIG. 6(f) shows a state where the light beam 102 is focused in a spot of a uniform intensity distribution only on a single bit 100a by the objective lens 1 owing to the tilt correction of the objective lens 1 in the state shown in FIG. 6(e) and crosstalk is avoided. Component members of a support 110 included in the objective lens driving device of the present invention for supporting the objective lens 1 are disposed in a plane perpendicular to the optical axis 1a of the objective lens 1.

BRIEF DESCRIPTION OF THE DRAWINGS

Preferred embodiments of the present invention will be described hereinafter with reference to the accompanying drawings, in which:

FIGS. 4(a) and 4(b) are diagrammatic views of assistance in explaining the effect of magnetic resilience in a state where magnetic resilience is available and a state where magnetic resilience is not available, respectively;

FIGS. 5(a) and 5(b) are views respectively showing a state where the center of turning motion of the movable unit coincides with the back principal point of the objective lens, and a state where the center of turning motion of the movable units does not coincide with the back principal point of the objective lens and a spot of a light beam is dislocated from a correct position;

FIGS. 32(*a*), 32(*b*), 32(*c*) and 32(*d*) are typical views of possible support members.

DESCRIPTION OF THE PREFERRED EMBODIMENTS

Figure 2:
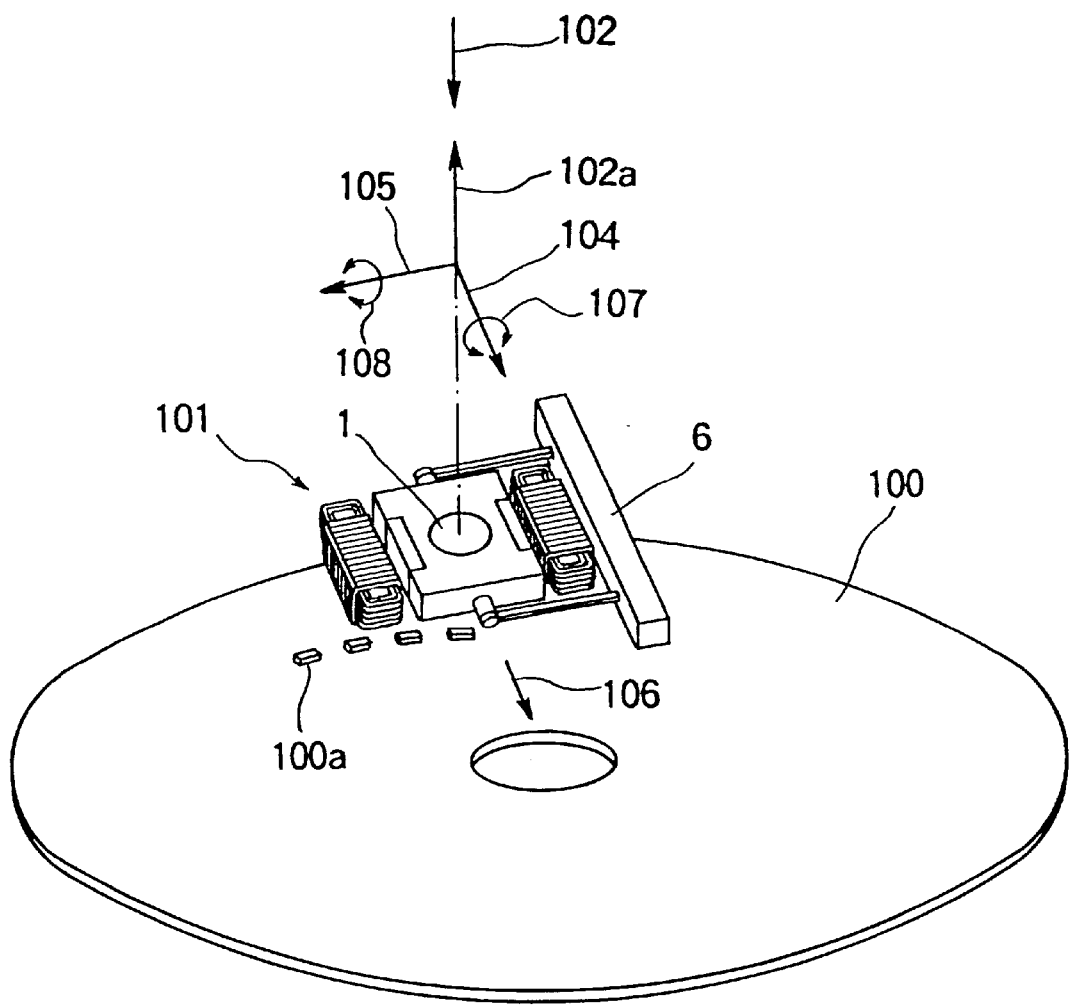
FIG. 2 is a perspective view of assistance in explaining the disposition of the objective lens driving device shown in FIG. 1 relative to a disk, and driving direction.

Referring to FIG. 2 showing the disposition of an objective lens driving device 101 relative to a disk 100 in a first embodiment according to the present invention, a light beam 102 emitted by a semiconductor laser or the like, not shown, and incident on an objective lens 1 has a beam axis 102*a* extending in a focusing direction, and a tangential tilt axis 104 and a radial tilt axis 105 (direction tangent to the disk) which are perpendicular to each other and to the beam axis 102*a*. The tangential tilt axis 104 is parallel to a tracking direction 106 in which the objective lens driving device 101 moves for tracking relative to the disk 100. Directions of turning or tilting about the tangential tilt axis 104 are called tangential tilt directions 107. The radial tilt axis 105 is parallel to a tangent to a track of the disk 100. Directions of turning or tilting about the radial tilt axis 105 are called radial tilt directions 108. Directions parallel to the beam axis 102*a* are called focusing directions.

Figure 3:
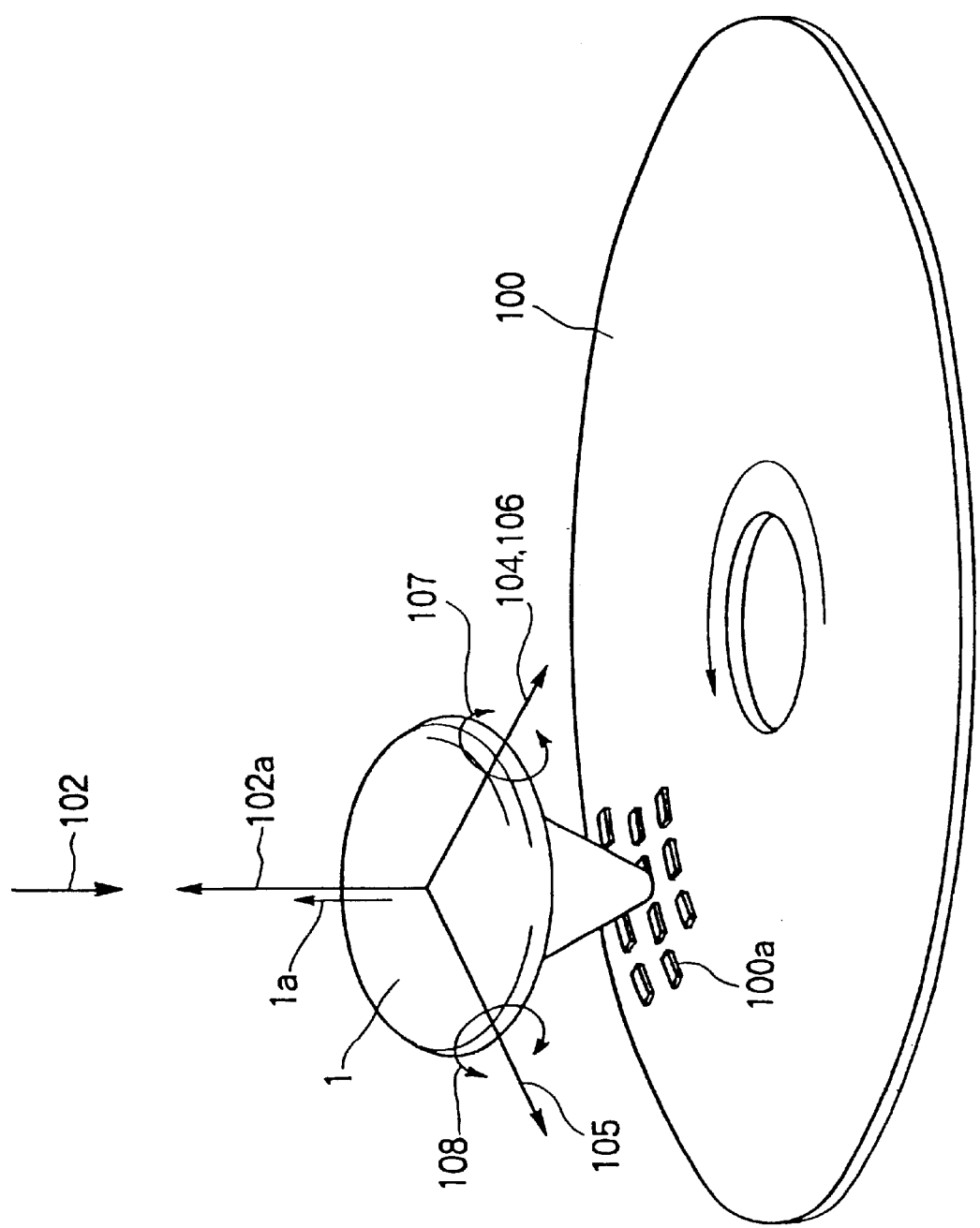
FIG. 3 is a schematic perspective view of assistance in explaining the relation between a disk and an objective lens driving direction.

FIG. 3 shows the disposition of the objective lens 1 relative to the disk 100. The optical axis 1*a* of the objective lens 1 coincides with the beam axis 102*a* when tilt correction is not made. Tilt correction is the tilting of the objective lens 1 in the tangential tilt direction 107 or the radial tilt direction 108 to create a state illustrated in FIGS. 6(*e*) and 6(*f*).

Although the tangential tilt axis 104 and the radial tilt axis 105 are spaced from the objective lens driving device 101 in FIGS. 2 and 3, actually, the tangential tilt axis 104 and the radial tilt axis 105 are preferably included in a plane including a support device 110 in a state where the optical axis 1*a* of the objective lens 1 coincides with the beam axis 102*a*.

The objective lens driving device 101 in the first embodiment will be described hereinafter with reference to the accompanying drawings.

Figure 1:
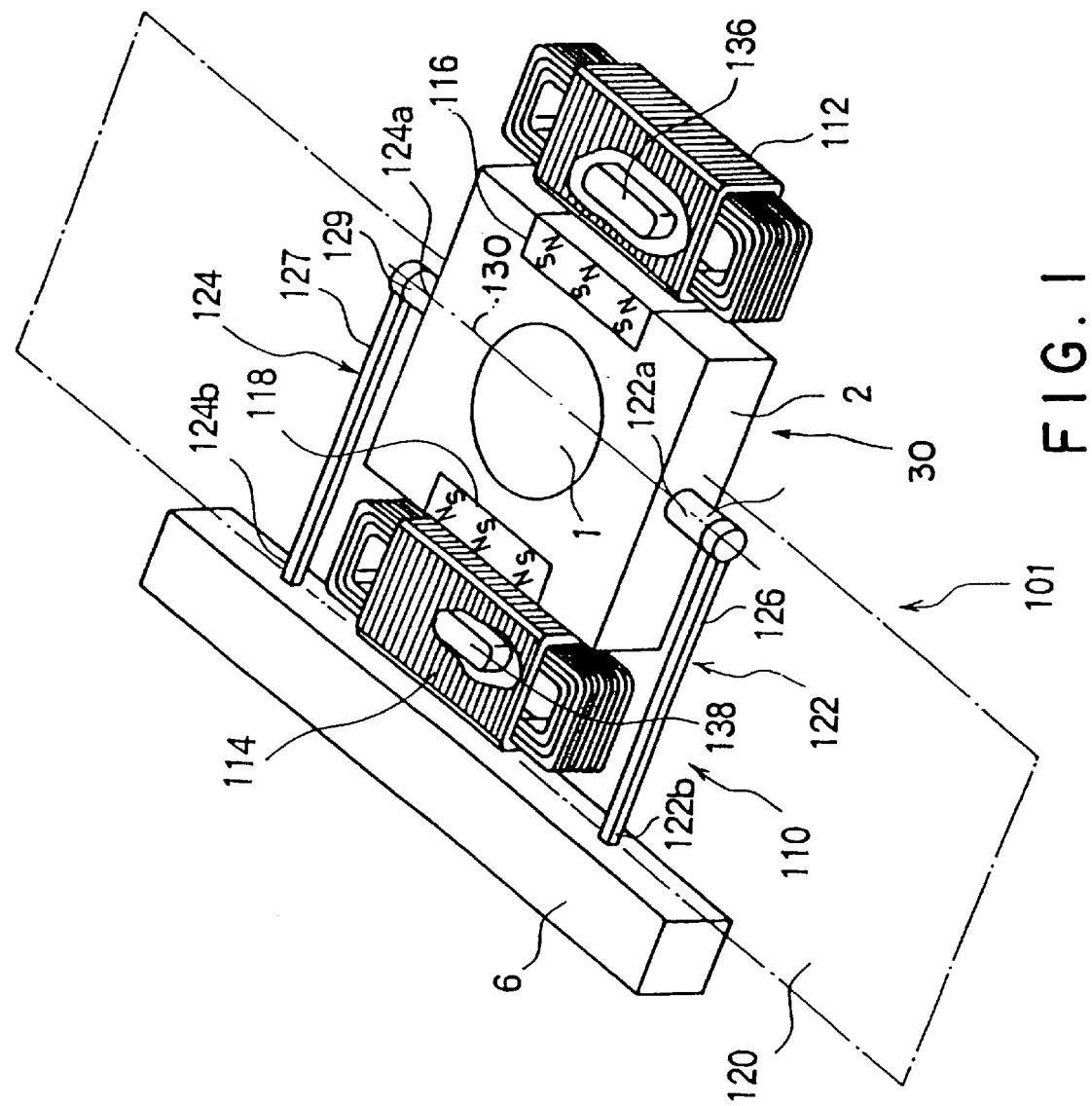
FIG. 1 is a schematic perspective view of an objective lens driving device in a preferred embodiment according to the present invention.

Referring to FIG. 1, a support block 6, is connected to a moving device, not shown, for moving the objective lens driving device 101 in the tracking direction 106, and the objective lens driving device 101 supports the objective lens 1 on the support block 6 and drives the objective lens 1. The objective lens driving device 101 comprises a lens holder 2 having the shape of a square plate and holding the objective lens 1, a support device 110 supporting the lens holder 2 holding the objective lens 1, and a magnetic actuator for driving the objective lens 1, comprising a plurality of magnetic circuits including driving coil assemblies 112 and 114, magnets 116 and 118, and magnetic blocks 136 and 138.

The support device 110 has a pair of equivalent support members 122 and 124 disposed in a plane 120 perpendicular to the optical axis 1*a* of the objective lens 1. The support members 122 and 124 have first ends 122*a* and 124*a* fixed respectively to the opposite side surfaces of the lens holder 2, and second ends 122*b* and 124*b* fixed to the support block 6. The support members 122 and 124 have first bar-shaped parts 126 and 127 extended from the support block 6, and second bar-shaped parts 128 and 129 fixed to the lens holder 2 and joined perpendicularly to the free ends of the first bar-shaped parts 126 and 127, respectively.

The rigidity, which represents the degree of difficulty in turning the objective lens 1 about an axis 130 extending through the first ends 122*a* and 124*a* of the support members 122 and 124, of the first ends 122*a* and 124*a* is lower than that of the second ends 122*b* and 124*b* of the support members 122 and 124.

In this embodiment, the second bar-shaped parts 128 and 129 are elastic members made of silicone rubber and the first bar-shaped parts 126 and 127 are metal wires, i.e., flexible members. The rigidity of the second bar-shaped parts 128 and 129 made of silicone rubber is lower by three or more orders of magnitude than that of the first bar-shaped parts 126 and 127.

Each of the driving coil assemblies 112 and 114 has a focusing coil, a tracking coil, a radial tilt coil and a tangential tilt coil. The driving coil assemblies 112 and 114 consisting of the plurality of coils, and the electromagnetic 116 and 118 constitute the plurality of component magnetic circuits of the magnetic actuator.

Driving currents are supplied to the coils of the driving coil assemblies 112 and 114 by a power source, not shown. The driving currents are controlled on the basis of control signals to control driving operations to drive a movable unit 30 including the objective lens 1 for movement relative to the support block 6.

The objective lens 1 can be translated in the focusing direction parallel to the beam axis 102a, and the tracking direction 106, and can be turned in the tangential tilt direction 107 and the radial tilt direction 108 for tilt correction by electromagnetic driving forces generated by the plurality of magnetic circuits when driving currents are supplied to the component coils of the driving coil assemblies 112 and 114. Thus, electromagnetic actuator having the plurality of magnetic circuits including the driving coil assemblies 112 and 114 is capable of driving the objective lens 1 for translation in the focusing direction and the tracking direction 106 along the two axis and for turning in the tangential tilt direction 107 and in the radial tilt direction 108 about the two axis.

As mentioned above, the second bar-shaped parts 128 and 129 are made of silicone rubber, and have a very low rigidity as compared with that of the first bar-shaped parts 126 and 127. Therefore, the distortion of the second bar-shaped parts 128 and 129 and that of the first bar-shaped parts 126 and 127 can be separately controlled. Consequently, a control operation for turning the objective lens 1 in the tangential direction 107 and the radial tilt direction 108 for tilt correction and a control operation for driving the objective lens 1 in the focusing direction and the tracking direction can be separately carried out, so that highly accurate tilt correction can be achieved.

The driving coil assemblies 112 and 114 are connected to the support block 6, and the magnets 116 and 118 are fixed to the lens holder 2 fixedly holding the objective lens 1, so that the magnets 116 and 118 move together with the objective lens 1. The movable unit 30 movable relative to the support block 6 comprises the objective lens 1, the lens holder 2 and the magnets 116 and 118. As shown in FIG. 1, the magnet 116 is fixed to an end of the lens holder 2 farther from the support block 6, and the magnet 118 is fixed to an end of the lens holder 2 nearer to the support block 6. The driving coil assemblies 112 and 114 are fixed to the support block 6 so as to be opposite to the magnets 116 and 118, respectively.

It is also possible to build a driving device of a moving coil type by fixing the driving coil assemblies 112 and 114 to the lens holder and connecting the magnets 116 and 118 to the support block 6 so that the magnets 116 and 118 are opposite to the magnets 116 and 118, respectively.

The positional relation between the objective lens 1, the lens holder 2 and the magnets 116 and 118 is determined so that the center of gravity of the movable unit 30 is on the plane 120 and the optical axis 1a of the objective lens 1.

The center of turning motions of the movable unit 30 for tilt correction in the tangential tilt direction 107 and the radial tilt direction 108 is on the plane 120 and the optical axis 1a of the objective lens 1 and coincides substantially with the center of gravity of the movable unit 30.

Since the center of turning motion of the movable unit 30 coincides substantially with the center of gravity of the movable unit 30, adverse resonance, such as cross action resonance, can be prevented and the magnetic actuator is able to move the lens holder 2 holding the objective lens 1 in the foregoing direction in satisfactory frequency characteristics. Even if adverse auxiliary resonance exhibited by the magnetic actuator in connection with the frequency characteristics of the driving action of the magnetic actuator owing to the dimensional accuracy of parts and the assembling accuracy of the magnetic actuator, the resonance can be effectively attenuated and the amplitude of the auxiliary resonance can be reduced to an insignificant level by the support members 122 and 124 because the first ends 122a and 124a of the support members 122 and 124 are made of silicone rubber.

The center of turning motion in the tangential tilt direction 107 and the radial tilt direction 108 of the movable unit 30 for tilt correction coincides substantially with the back principal point of the objective lens 1. The plane 120 coincides substantially with the principal plane of the objective lens 1. FIG. 5(a) shows a state where the center 132 of turning motion of the movable unit 30 coincides with the back principal point 134 of the objective lens 1. FIG. 5(b) shows a state where the center 132 of turning motion of the movable unit 30 does not coincide with the back principal point 134 of the objective lens 1 for comparison.

If the center 132 of turning motion of the movable unit 30 does not coincide with the back principal point 134 of the objective lens 1 as shown in FIG. 5(b), a focusing point where the light beam 102 is focused in a spot on the disk 100 is dislocated by a shift error δ from a correct position when the objective lens 1 is turned and, consequently, the stable control of the magnetic actuator cannot be achieved.

If the center 132 of turning motion of the movable unit 30 coincides with the back principal point 134 of the objective lens 1 as shown in FIG. 5(a), the beam axis 102a of the light beam passes the back principal point 134 and, consequently, the incident light beam 102 travels forward from the back principal point 134, so that the shift error δ can be eliminated and the stable control of the magnetic actuator can be achieved.

The thickness, i.e., a dimension along the optical axis 1a of the objective lens 1, of the lens holder 2 is bisected by the plane 120 including the back principal point 134 of the objective lens 1. Therefore, the lens holder does not produce unnecessary torque, can be stably supported on the support members 122 and 124, and makes the center 132 of turning motion of the movable unit 30 coincide stably with the back principal point 134 of the objective lens 1.

A method of restoring the movable unit 30 to its neutral position will be described with reference to FIGS. 4(a) and 4(b).

As shown in a partly cutaway view in FIG. 1, the magnetic coil assemblies 112 and 114 are provided internally with the magnetic blocks 136 and 138 disposed opposite to the magnets 116 and 118, respectively. FIG. 4(a) shows the objective lens driving device 101 in this embodiment provided with the magnetic blocks 136 and 136 disposed opposite to the magnets 116 and 118, respectively, and FIG. 4(b) shows an objective lens driving device not provided with any element corresponding to the 136 and 138 for comparison. When the movable unit 30 including the lens holder 2 is moved in the focusing direction parallel to the beam axis 102a of the light beam 102, the first bar-shaped part 126 undergoes bending deformation. If the objective lens driving device 101 is not provided with any elements corresponding to the magnetic blocks 136 and 138 as shown in FIG. 4(b), the lens holder 2 is tilted relative to the beam axis 102a and, consequently, the movable unit 30 is tilted as it is moved in the focusing direction and hence accurate focusing operation cannot be achieved.

Figure 4A:
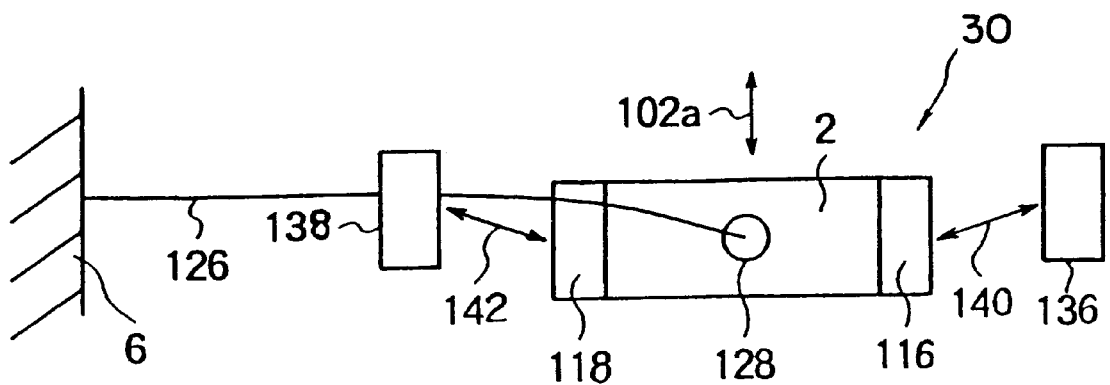
Figure 4A:
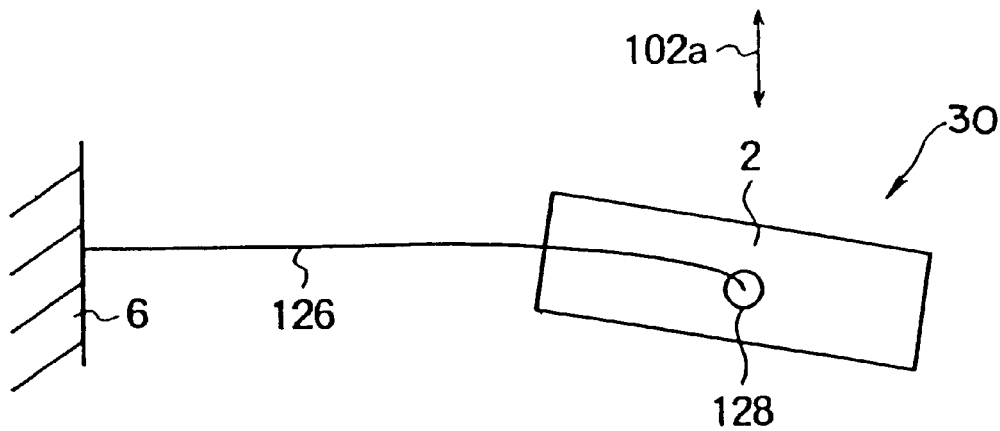
Figure 6A:
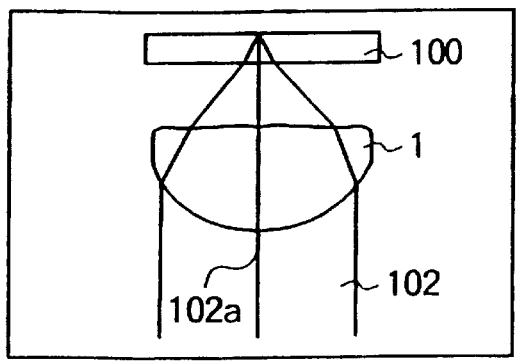
FIGS. 6(a) to 6(f) are diagrammatic views respectively showing a state where a disk is not warped relative to the beam axis of a light beam incident on an objective lens (FIG.6(a)), a state where a light beam is focused in a spot on a single bit by an objective lens in the state shown in FIG. 6(a), a state where a disk is warped ((FIG.6(c)), a state where the light beam is focused in a spot by the objective lens on a bit and an adjacent in the state shown in FIG. 6(c) bit because the tilt of the objective lens relative to the disk is not corrected ((FIG.6(d)), a state where the disk is warped and the position of the objective lens is changed for tilt correction ((FIG. 6(e)), and a state where crosstalk is avoided owing to the correction of the tilt of the objective lens in the state shown in FIG. 6(e) (FIG.6(f))
Figure 6B:
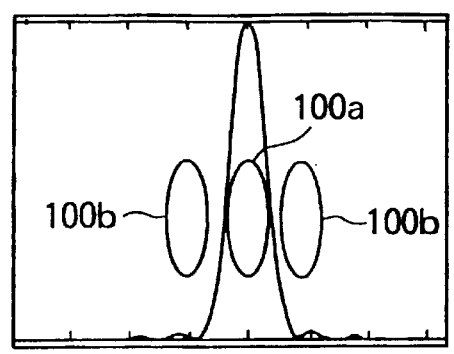
Figure 6C:
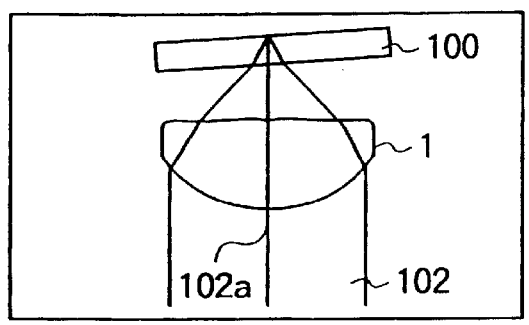
Figure 6D:
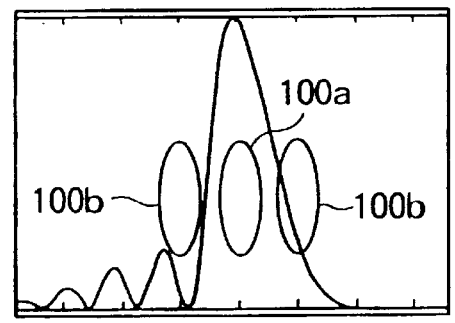
Figure 6E:
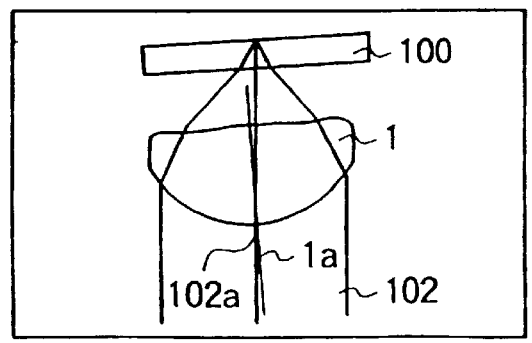
Figure 6F:
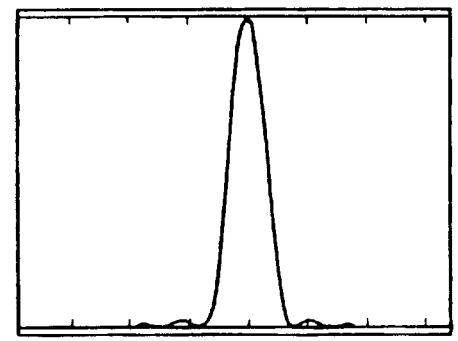

In the objective lens driving device 101 of the present invention provided with the magnetic blocks 136 and 138 as shown in FIG. 4(a), a magnetic resilience 140, namely, magnetic attraction, works between the magnetic block 136 and the magnet 116. The magnetic resilience 140, namely, the magnetic attraction, works against the movement of the magnet 116 along the beam axis 102a relative to the magnetic block 136 and tries to hold the movable unit 30 at its predetermined neutral position. Similarly, a magnetic resilience 142 works between the magnetic block 138 and the magnet 118. Consequently, the lens holder 2 can be restrained from tilting relative to the beam axis 102a and can be stably held in its normal position as shown in FIG. 4(a) by the agency of the magnetic resilience 140 and 142, and the movable unit 30 can be controlled for focusing without being tilted.

As shown in FIG. 1, the magnets 116 and 118 are magnetized in a direction parallel to the length of the first bar-shaped parts 126 and 127. Therefore, the magnetic resiliences 140 and 142 have components of force acting in a direction along the length of the first bar-shaped parts 126 and 127, in which high resilience acts, and do not have any components of force acting in the direction of the axes of the second bar-shaped parts 128 and 129. Thus, the lens holder 2 can be stably supported on the support members 122 and 124.

The magnetic flux of the magnets 116 and 118 or the size of magnetic gaps are determined so that the spring constant of the magnetic resilience 140 acting between the magnetic block 136 and the magnet 116 is greater than that of the magnetic resilience 142 acting between the magnetic block 138 and the magnet 118 to avoid the bending or the buckling of the first bar-shaped parts 126 and 127 by the magnetic resiliences 140 and 142, namely, the magnetic attractions, acting to extend the first bar-shaped parts 126 and 127 longitudinally. Thus, the lens holder 2 can be stably supported on the support members 122 and 124.

As is apparent from the foregoing description, the objective lens driving device 101 in this embodiment is capable of separately carrying out operations for turning the movable unit 30 in the tangential tilt direction 107 and the radial tilt direction 108 for tilt correction, and operations for moving the movable unit 30 in the focusing direction and the tracking direction. Therefore, the tilt of the movable unit 30 can be highly accurately and quickly corrected and hence the comatic aberration of the spot of the light beam on the signal recording surface of the optical disk 100 can be reduced.

Figure 7:
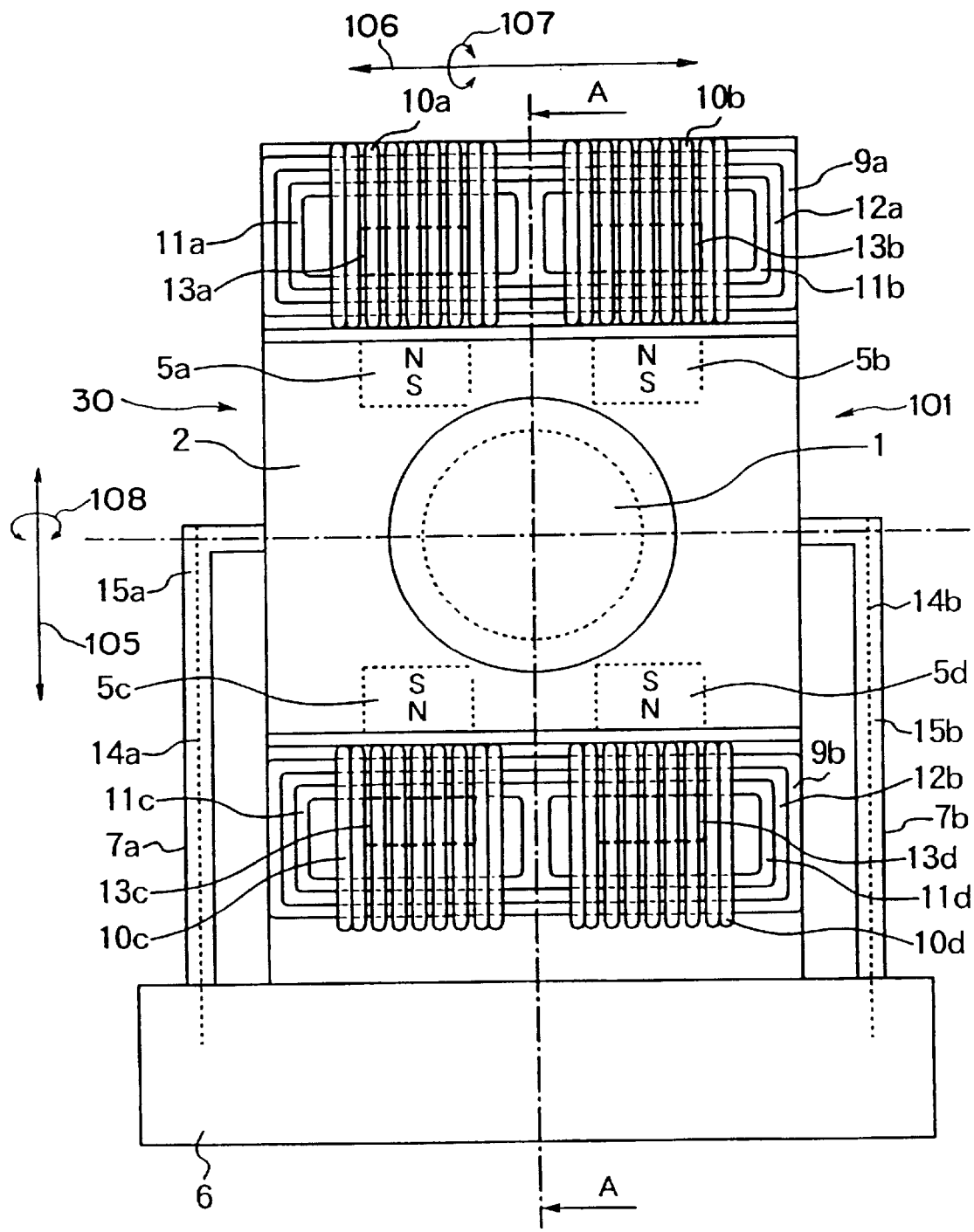
FIG. 7 is a schematic plan view of an objective lens driving device in a second embodiment according to the present invention.
Figure 8:
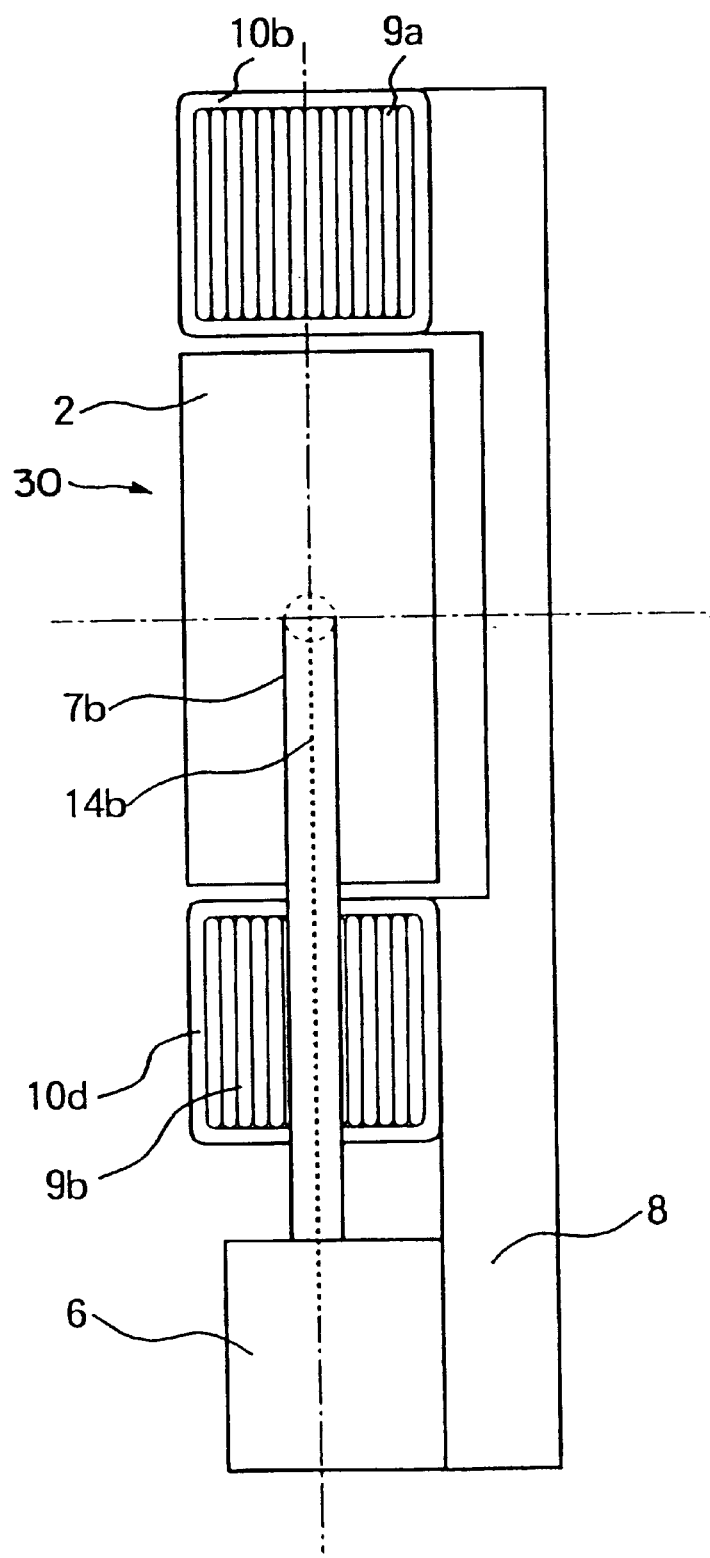
FIG. 8 is a schematic side view of the objective lens driving device of FIG. 7.
Figure 9:
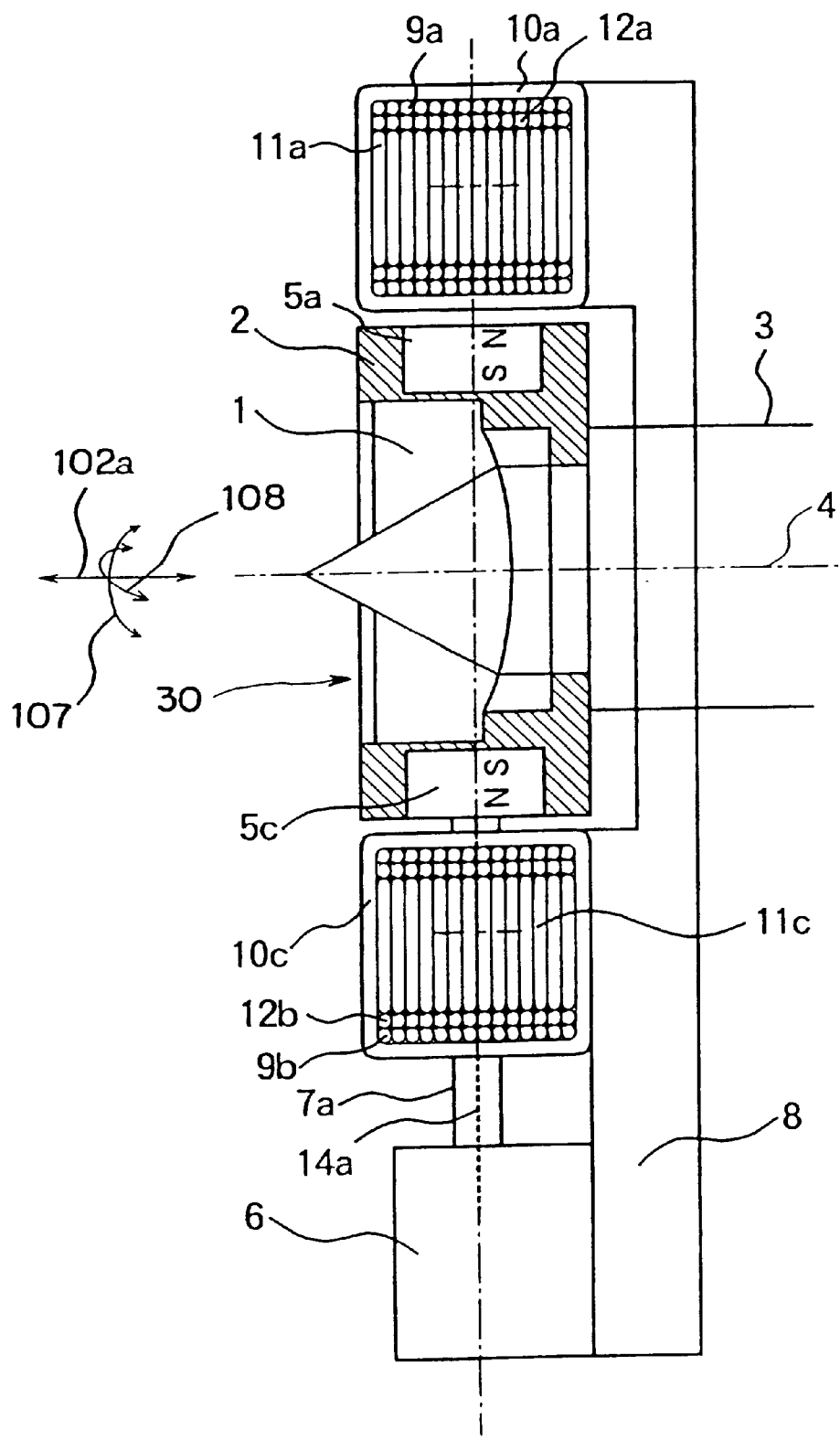
FIG. 9 is a schematic sectional view taken on line A—A in FIG. 7.

An objective lens driving device 101 in a second embodiment according to the present invention will be described with reference to FIGS. 7 to 9. Referring to FIGS. 7 to 9, the objective lens driving device 101 comprises a lens holder 2 holding an objective lens 1, four magnets 5a, 5b, 5c and 5d attached to the lens holder 2, a pair or support members 7a and 7b, focusing coils 9a and 9b, tracking coils 10a, 10b, 10c, and 10d, radial tilt correcting coils 11a, 11b, 11c and 11d, tangential tilt correcting coils 12a and 12b, and four magnetic blocks 13a, 13b, 13c and 13d disposed in the plurality of coils 9a, 9b, 10a 10b, 10c, 10d 11a, 11b 11c and 11d.

The focusing coils 9a and 9b are used for correcting the position of the objective lens 1 with respect to a focusing direction, namely, a direction along the beam axis 102a of a light beam 102. The tracking coils 10a, 10b, 10c and 10d are used for correcting the position of the objective lens 1 with respect to a tracking direction. The radial tilt correcting coils 11a, 11b, 11c and 11d are used for correcting the tilt of the objective lens 1 with respect to a radial tilt direction 108. The tangential tilt correcting coils 12a and 12b are used for correcting the tilt of the objective lens 1 with respect to a tangential direction 107.

The pair of substantially L-shaped support members 7a and 7b support the lens holder 2 so that the lens holder 2 can be translated in the focusing direction and the tracking direction 106 and can be turned in the radial tilt direction 108 and the tangential tilt direction 107. First ends of the pair of support members 7a and 7b are fixed to the lens holder 2, and second ends of the same are fixed to a support block 6.

The plurality of coils 9a, 9b, 10a, 10b, 10c, 10d, 11a, 11b, 11c, 11d, 12a and 12b for driving he lens holder for translation in the focusing direction and the tracking direction 106 and for turning in the radial tilt direction 108 and the tangential tilt direction 107 are disposed on a base block 8 holding the support block 6.

The magnet 5a and the magnetic block 13a, the magnet 5b and the magnetic block 13b, the magnet 5c and the magnetic block 13c, and the magnet 5d and the magnetic block 13d are combined to form magnetic circuits, respectively. Currents are supplied individually to the focusing coils 9a and 9b, tracking coils 10a, 10b, 10c and 10d, the radial tilt correcting coils 11a, 11b, 11c and 11d, and the tangential tilt correcting coils 12a and 12b. Then, the focusing coils 9a and 9b, tracking coils 10a, 10b, 10c and 10d, the radial tilt correcting coils 11a, 11b, 11c and 11d, and the tangential tilt correcting coils 12a and 12b produce predetermined Lorentz forces to move the lens holder 2 in desired directions for translation along the two axes and for turning about the two axes.

The objective lens driving device 101 in the second embodiment is provided with the magnetic blocks 13a, 13b, 13c and 13d for driving operations in a high sensitivity, however, the magnetic blocks 13a, 13b, 13c and 13d may be omitted, and open magnetic circuits having only the magnets 5a, 5b, 5c and 5d may be employed instead of the foregoing magnetic circuits of the magnet 5a and the magnetic block 13a, the magnet 5b and the magnetic block 13b, the magnet 5c and the magnetic block 13c and the magnet 5d and the magnetic block 13d. The objective lens driving device 101 in the second embodiment is of a moving magnet type. Naturally, various modifications of the coils and the magnetic circuits are possible.

In the objective lens driving device 101 in the second embodiment, the pair of support members 7a and 7b are disposed in a plane 120 perpendicular to the optical axis 1a of the objective lens 1. A principal material forming the support members 7a and 7b is elastic rubber. Second parts 17 of the pair of support members 7a and 7b, extending in a tangential direction parallel to the radial tilt axis 105 have bar-shaped bodies 15a and 15b made of elastic rubber and flexible wires 14a and 14b extended in the bar-shaped bodies 15a and 15b to enhance the rigidity of the second parts of the pair of support members 7a and 7b, extending in a tangential direction parallel to the radial tilt axis 105.

Figure 10:
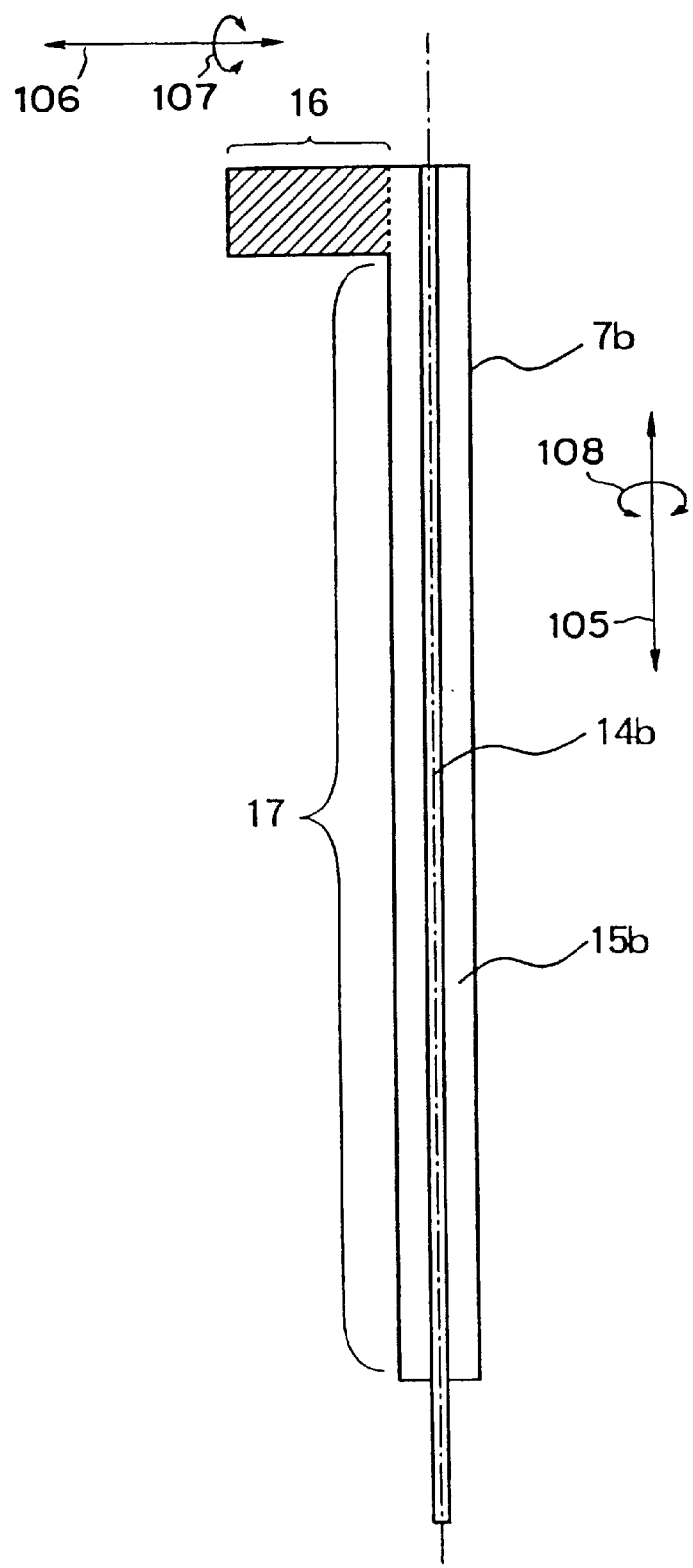
FIG. 10 is a sectional view of a support member.

The support members 7a and 7b are the same in construction and hence only the support member 7b will be described with reference to FIG. 10 showing the support member 7b in a sectional view. As shown in FIG. 10, the support member 7b has a first part 16 made of elastic rubber, and a second part 17 having made of elastic rubber and strengthened by the wire 14b. When the lens holder 2 is driven for tangential tilt correction, the first part 16 is twisted about an axis parallel to the tangential tilt direction 107. If the second parts 17 have only the bar-shaped bodies 15a and 15b made of elastic rubber and are not provided with the wires 14a and 14b, i.e., if the support members 7a and 7b are made of only elastic rubber, the second parts 17 extending in the tangential direction parallel to the radial tilt axis 105 are deformed greatly. If the second parts 17 are deformed greatly, the lens holder 2 undergoes not only tangential tilting but also unnecessary displacement in the focusing direction and in a direction parallel to the radial tilt axis 105.

If the support members 7a and 7b are made of a uniform material, the second parts 17 are inevitably subject to deformation entailing the unnecessary displacement of the lens holder 2, which will be explained below.

The torsional rigidity of the shaded first part 16, namely, rigidity resisting twisting in the tangential tilt direction 107, is inversely proportional to the length of the first part 16. The bending rigidity of the second part 17, namely, rigidity resisting bending in the tangential tilt direction 107, is inversely proportional to the length of the second part 17. The length of the first part 16 is inevitably far smaller than that of the second part 17 to secure a degree of freedom of motion in the focusing direction. Therefore, the torsional rigidity of the shaded first part 16, namely, rigidity resisting twisting in the tangential tilt direction 107, is inevitably higher than the bending rigidity of the second part 17, namely, rigidity resisting bending in the tangential tilt direction 107.

In order that the second parts 17 are hardly subject to unnecessary deformation, the second parts 17 of the pair of support members 7a and 7b are preferably bar-shaped bodies 15a and 15b made of elastic rubber, and the flexible wires 14a and 14b of a metal having a Young's modulus more than 10,000 times that of the elastic rubber forming the bar-shaped bodies 15a and 15b, extend within the bar-shaped bodies 15a and 15b. Any suitable parts having a sufficiently high rigidity may be employed instead of the wires 14a and 14b.

The second parts 17 extended in parallel to the radial tilt axis 105 may be only wires not coated with elastic rubber or the like. It is essential to design the first parts 16 and the second parts so that that the respective rigidities of the first parts 16 and the second parts 17 are greatly different from each other, and the second parts 17 are deformed scarcely and only the first parts 16 are twisted greatly when the lens holder 2 is tilted in the tangential tilt direction 107.

Elastic materials suitable for forming the bar-shaped bodies 15a and 15b are butyl rubber, neoprene, silicone rubber, natural rubber and such. Since the bar-shaped bodies 15a and 15b, namely, the principal parts of the support members 7a and 7b, are made of elastic rubber, the support members 7a and 7b have a satisfactory damping effect, and satisfactory frequency characteristics can be secured with respect to the four axes.

In the objective lens driving device 101 in the second embodiment, the center of gravity of the movable unit 30 comprising the objective lens 1, the lens holder 2 and the magnets 5a, 5b, 5c and 5b is on the optical axis 4 of the objective lens 1 and on the plane 120 perpendicular to the optical axis 4, and the plane 120 perpendicular to the optical axis 4 coincides with the principal plane of the objective lens 1. Therefore, the spot of the light beam formed on the signal recording surface of the disk will not be shifted when the objective lens 1 is turned.

An objective lens driving device in a third embodiment according to the present invention will be described hereinafter with reference to FIGS. 11 to 14. In the following description of preferred embodiments of the present invention, parts like or corresponding to those shown in FIGS. 7 to 10 are designated by the same reference characters and the description thereof will be omitted to avoid duplication.

Figure 11:
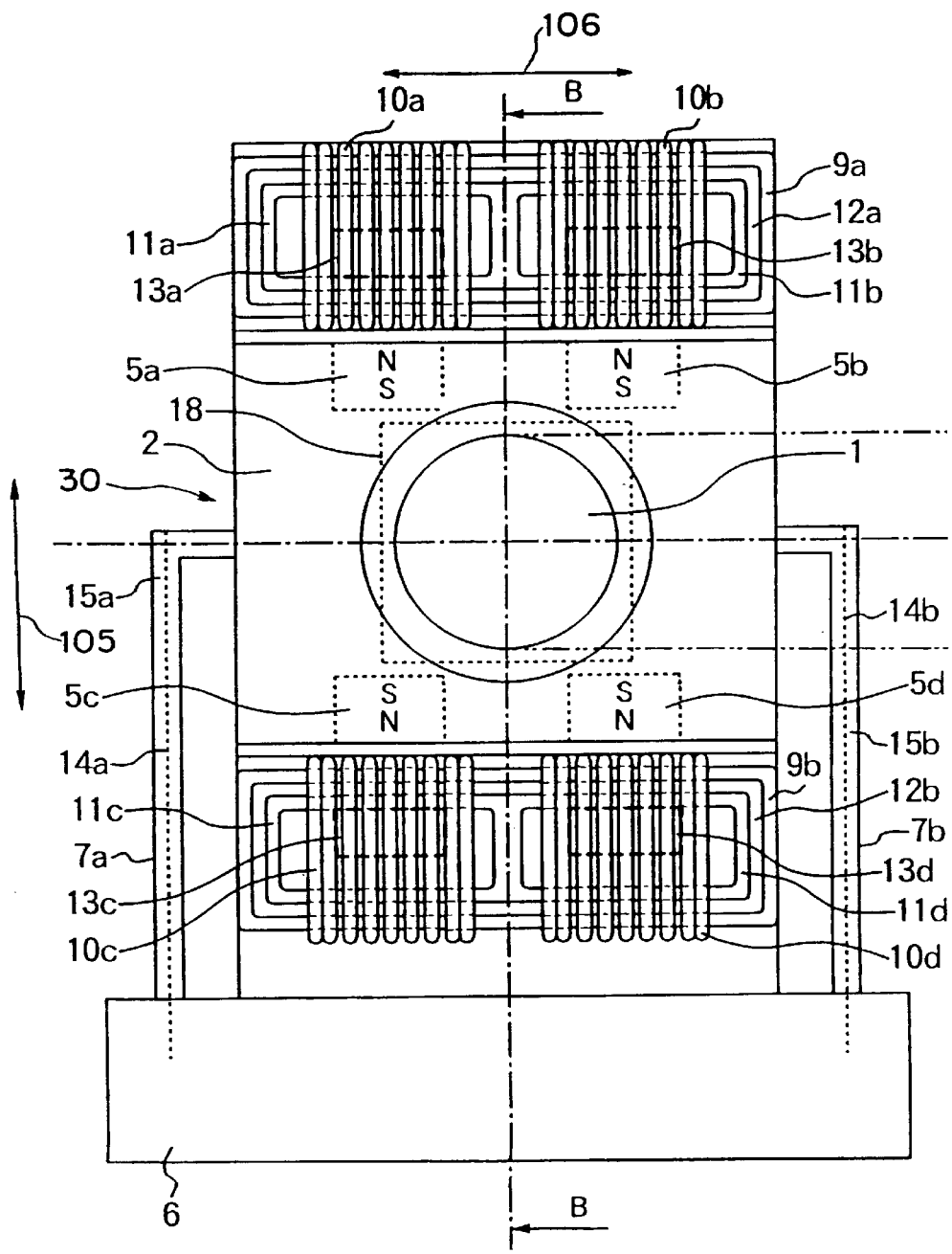
FIG. 11 is a schematic plan view of an objective lens driving device in a second embodiment according to the present invention.
Figure 12:
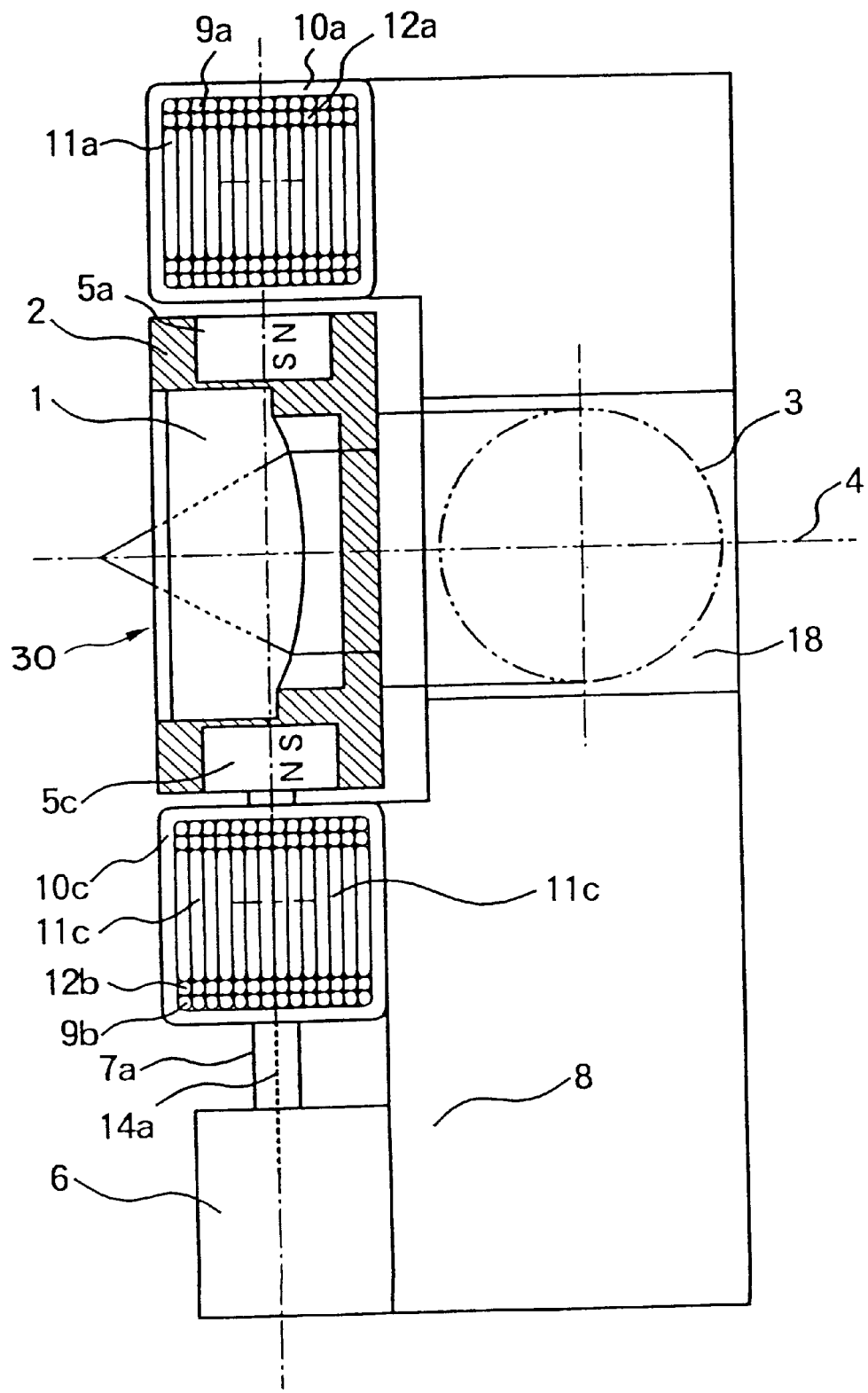
FIG. 12 is a schematic side view of the objective lens driving device of FIG. 11.

FIG. 11 is a schematic plan view of the objective lens driving device in the third embodiment, and FIG. 12 is a schematic sectional view taken on line B—B in FIG. 11. Referring to FIGS. 11 and 12, an incident light beam 3 travels in a direction perpendicular to the optical axis 4 of an objective lens 1 and falls on a reflecting mirror 18, and the reflecting mirror 18 reflects the light beam 3 toward the objective lens lens 1. As is obvious from FIG. 12, the objective lens driving device can be built in a relatively thin construction.

Figure 13:
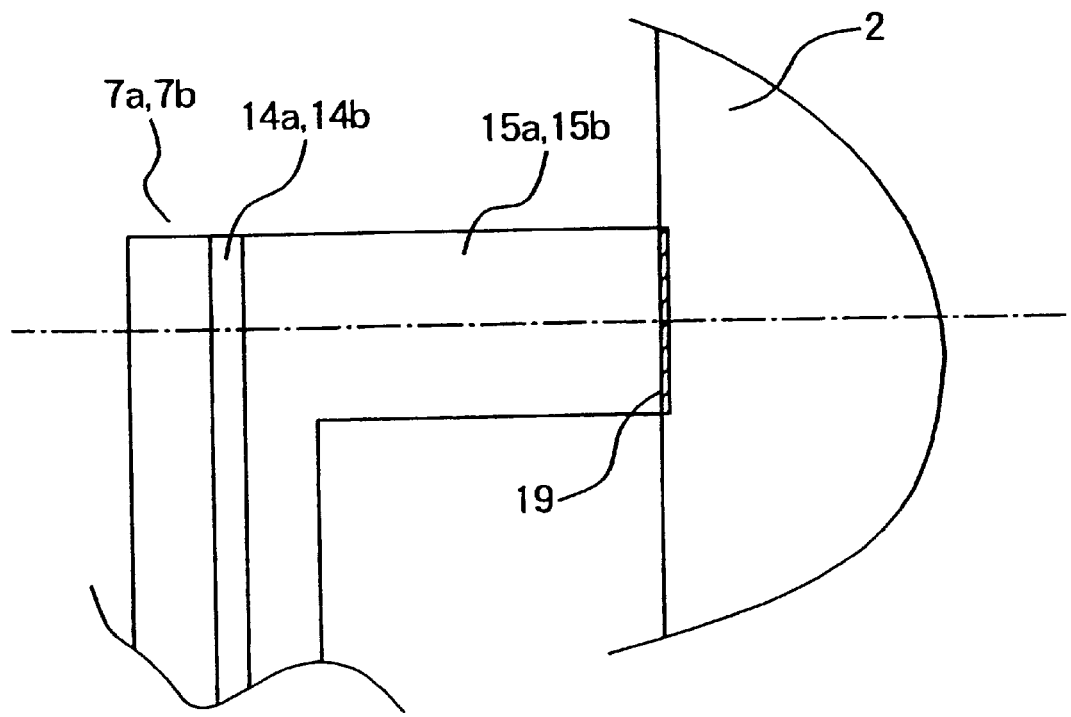
FIG. 13 is a schematic sectional view of a joint of a lens holder and a support member.

FIG. 13 shows a joint of a lens holder 2 and a support member 7a (7b) in a schematic sectional view. The end surface of a first part of a body 15a (15b) made of elastic rubber of the support member 7a (7b) is bonded adhesively to the lens holder 2 with an adhesive 19.

Figure 14:
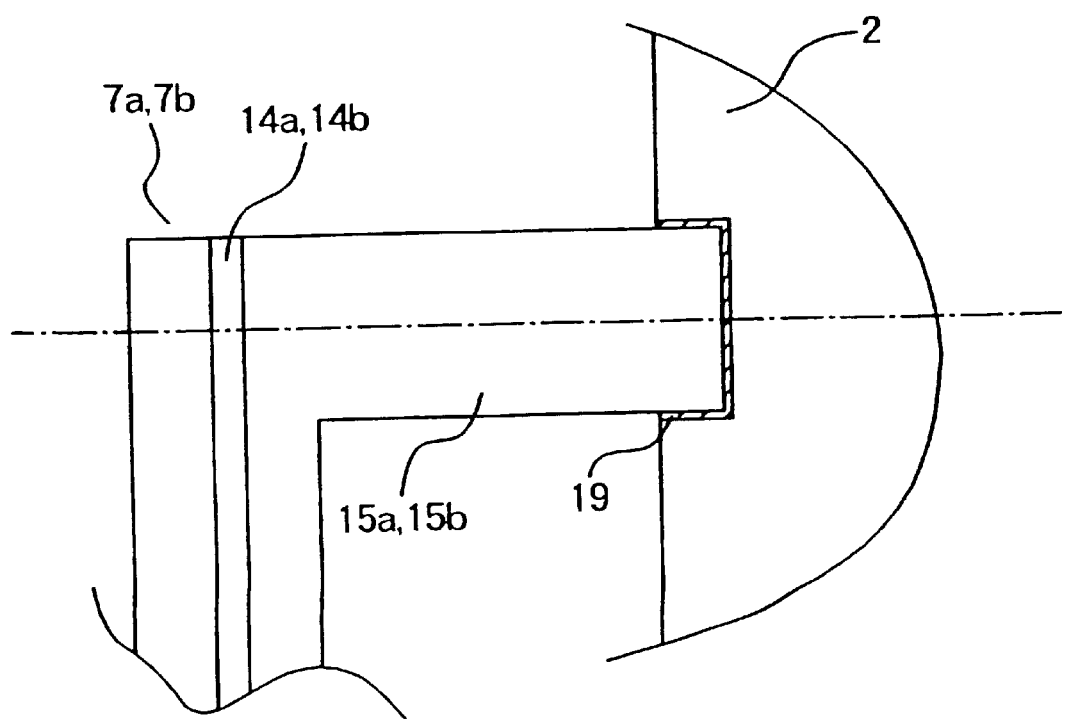
FIG. 14 is a schematic sectional view of another joint of a lens holder and a support member.

FIG. 14 shows a joint of the lens holder 2 and the support member 7a (7b) in a modification of the joint shown in FIG. 13. An end portion of the first part of the body 15a (15b) made of elastic rubber of the support member 7a (7b) is fitted in a hole 20a formed in the lens holder 2 and is bonded adhesively to the lens holder 2 with an adhesive 19. The joint shown in FIG. 14 has a high bonding strength and facilitates the positional adjustment of the support members 7a and 7b on the lens holder 2 when assembling the support members 7a and 7b and the lens holder 2.

An objective lens driving device in a fourth embodiment according to the present invention will be described with reference to FIGS. 15 to 19.

Figure 15:
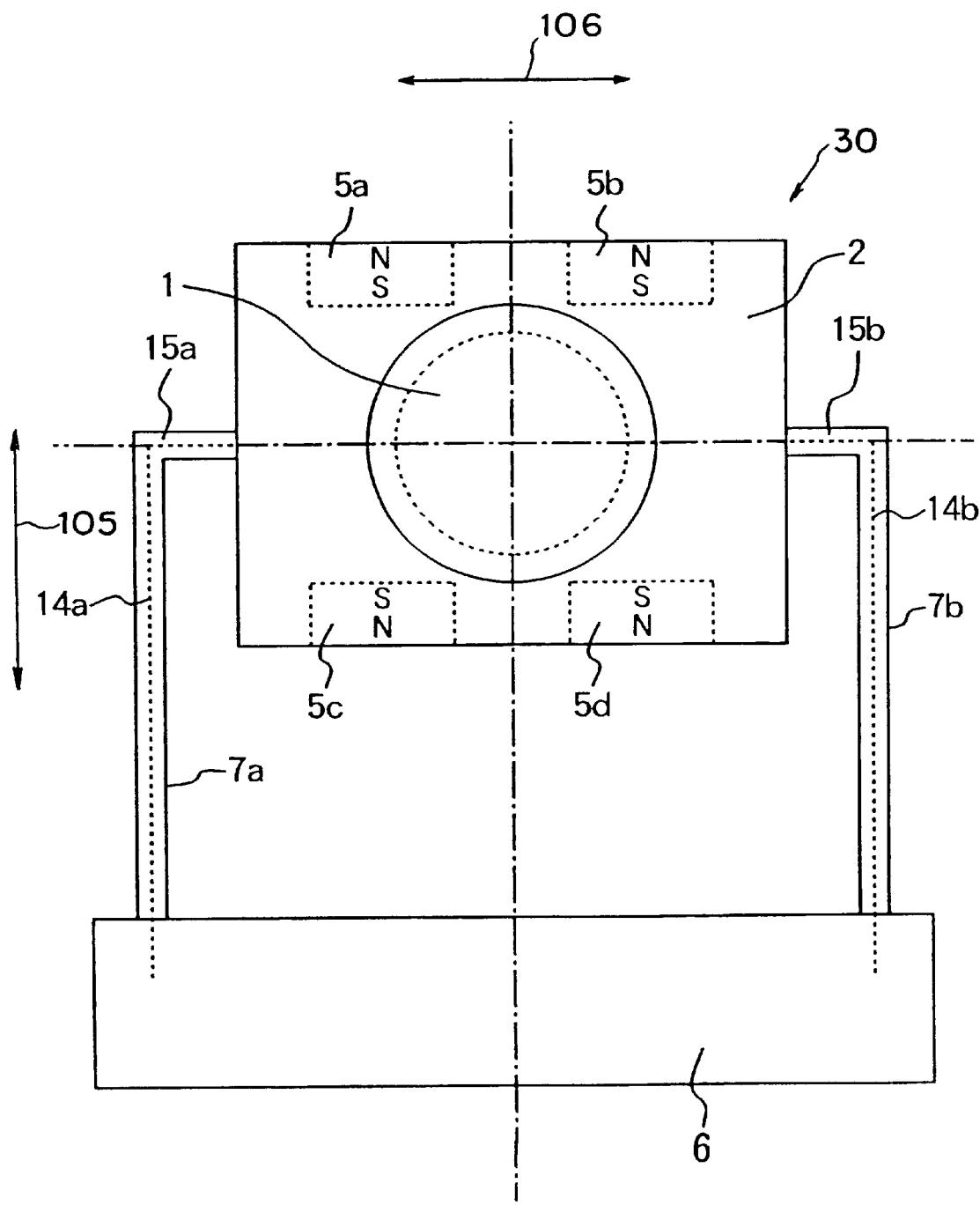
FIG. 15 is a schematic plan view of a pair of support members each provided internally with an L-shaped wire.

Each of a pair of L-shaped support members 7a and 7b has a first part extending in a direction parallel to tracking direction 106, and a second part extending in a direction parallel to a radial tilt axis 105. Wires 14a and 14b are extended through the first parts and the second parts of the support members 7a and 7b, respectively. As shown in FIG. 15, end sections of parts of the wires 14a and 14b extending through the second part of the support members 7a and 7b are stuck into a support block 6 nearby end surface of the lens holder 2.

Figure 16:
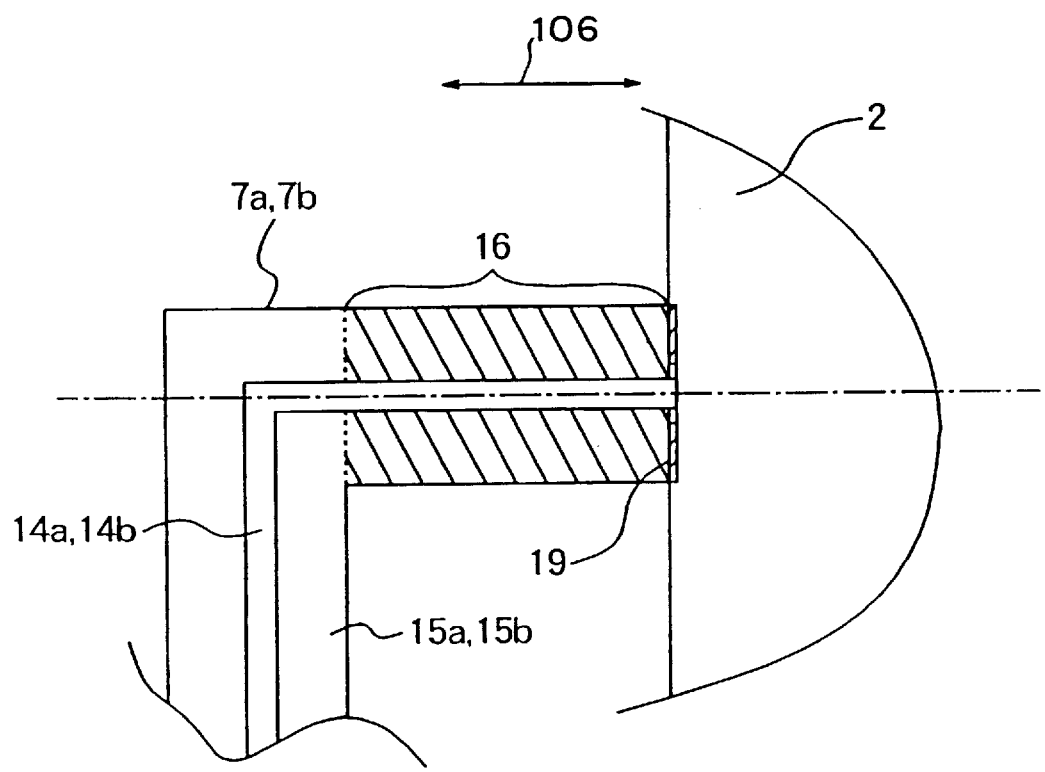
FIG. 16 an enlarged sectional view of a support member and a lens holder shown in FIG. 15.

Referring to FIG. 16 showing a joint of the support member 7a (7b) and a lens holder 2 included in the objective lens driving device shown in FIG. 15 in an enlarged sectional view, the end surface of a first part 16 of a body 15a (15b) made of elastic rubber of the support member 7a (7b) excluding a portion around the end surface of the wire 14a (14b) is bonded adhesively to the lens holder 2 with an adhesive 19. End surfaces of parts of the L-shaped wires 14a and 14b, extending in the first parts 16 in the tracking direction 106 are not bonded to the lens holder 2. Therefore, when the lens holder 2 is turned for tangential tilting, only the first parts 16 of the bodies 15a and 15b of the support members 7a and 7b are twisted in a tangential tilt direction 107. In the objective lens driving device shown in FIGS. 15 and 16, the first parts 16 of the bodies 15a and 15b of elastic rubber are not compressed in a tracking direction 106 when the lens holder 2 is displaced in the tracking direction 106 because the parts of the wires 14a and 14b extending in the tracking direction 106 rest on the side surfaces of the lens holder 2 and, consequently, a precise tracing operation can be achieved.

Figure 17:
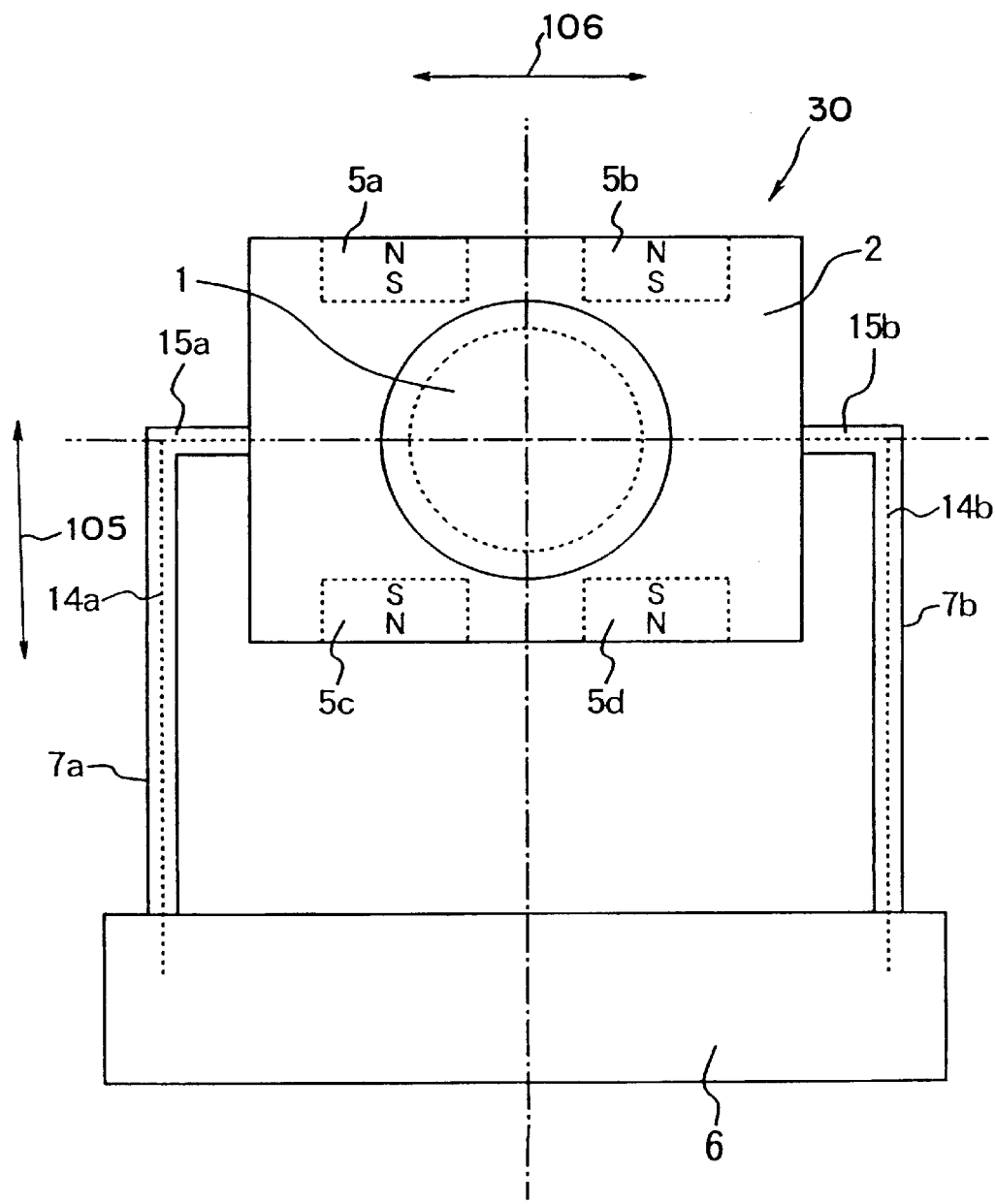
FIG. 17 is a schematic plan view of a pair of support members each provided internally with an L-shaped wire having a part stuck in a lens holder.
Figure 18:
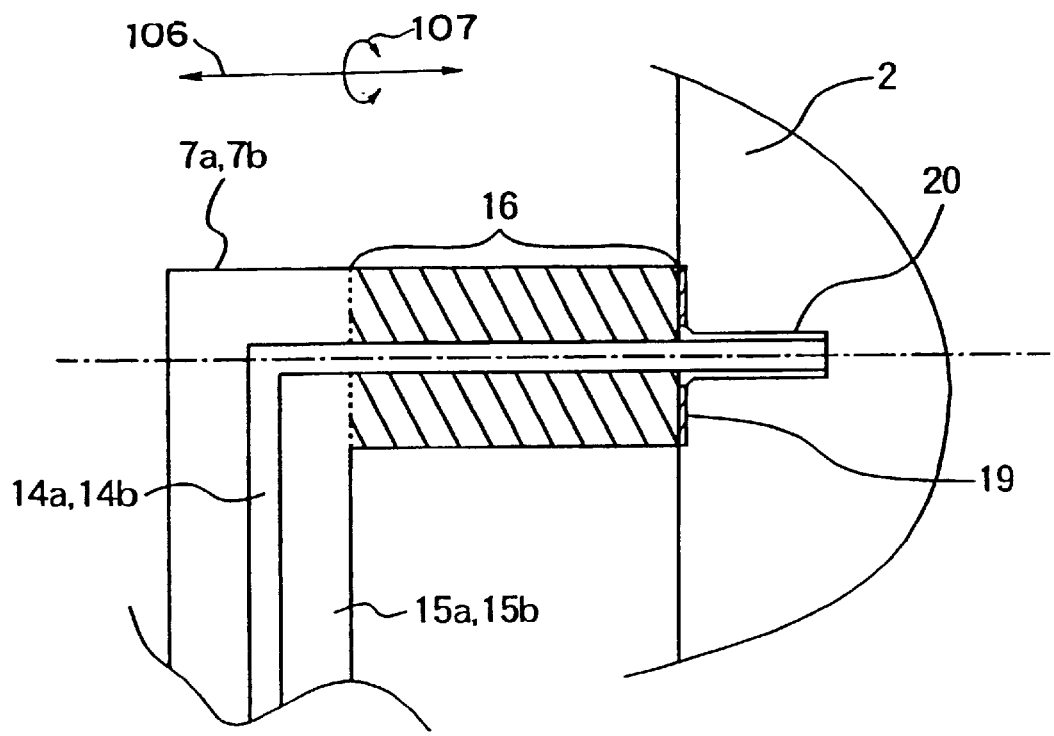
FIG. 18 is an enlarged sectional view showing a joint of a support member and a lens holder shown in FIG. 17.

In a modification shown in FIGS. 17 and 18, end portions of the parts of the L-shaped wires 14a and 14b, extending in the tracking direction 106 are loosely stuck in the lens holder 2. Referring to FIG. 18 showing a joint of the support member 7a (7b) and the lens holder 2 included in the objective lens driving device shown in FIG. 17 in an enlarged sectional view, the end surface of a first part 16 of a body 15a (15b) made of elastic rubber of the support member 7a (7b) excluding a portion around the end surface of the wire 14a (14b) is bonded adhesively to the lens holder 2 with an adhesive 19. End portions of the parts of the L-shaped wires 14a and 14b, extending in the tracking direction 106 are loosely stuck in the lens holder 2 and are not bonded to the lens holder 2. Therefore, when the lens holder 2 is turned for tangential tilting, only the first parts 16 of the bodies 15a and 15b of the support members 7a and 7b, extending in the tracking direction 106 are twisted in a tangential tilt direction 107.

Figure 19:
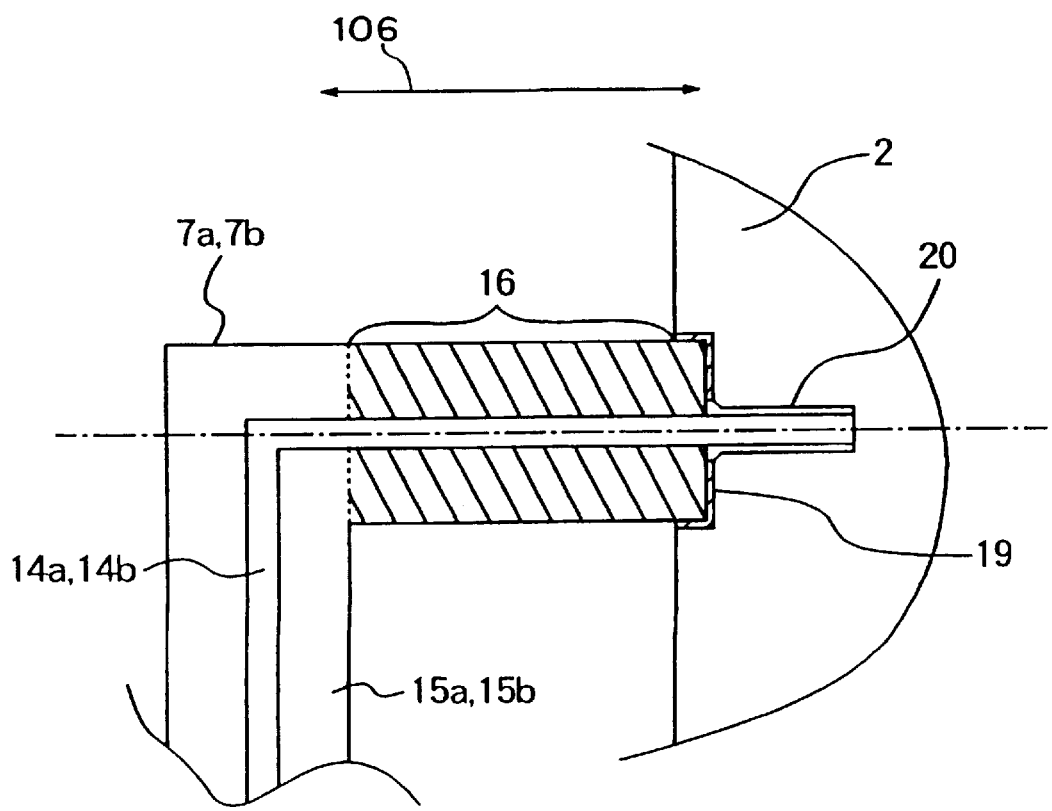
FIG. 19 is an enlarged sectional view showing another joint of a support member and a lens holder shown in FIG. 17.

FIG. 19 shows a joint of the lens holder 2 and the support member 7a (7b) in a modification of the joint shown in FIG. 18. An end portion of a first part 16 of a body 15a (15b) made of elastic rubber of the support member 7a (7b) is fitted in a hole formed in the lens holder 2 and is bonded adhesively to the lens holder 2 with an adhesive 19. End portions of parts of the L-shaped wires 14a and 14b, extending in the tracking direction 106 are loosely stuck in bores 20 formed in the lens holder 2 and are not bonded to the lens holder 2. Therefore, when the lens holder 2 is turned for tangential tilting, only the first parts 16 of the bodies 15a and 15b of the support members 7a and 7b, extending in the tracking direction 106 are twisted in a tangential tilt direction 107.

In the objective lens driving device shown in FIGS. 17, 18 and 19, the first parts 16 of the bodies 15a and 15b of elastic rubber are not compressed in a tracking direction 106 when the lens holder 2 is displaced in the tracking direction 106 because the parts of the wires 14a and 14b, extending in the tracking direction 106 rest on the bottom surfaces of the bores 20 of the lens holder 2 and, consequently, a precise tracing operation can be achieved. Since the parts of the wires 14a and 14b, extending in the tracking direction 106 are fitted in the bores 20 formed in the lens holder 2 so as to be axially slidable in the tracking direction 106 and so as to be turnable in the tangential tilt direction 107, the first parts 16 of the bodies 15a and 15b made of elastic rubber are not deformed in the focusing direction when the lens holder 2 is displaced in the focusing direction and, consequently, a precise focusing operation can be achieved.

Although the end surfaces of the first parts of the bodies 15a and 15b of elastic rubber of the support members 7a and 7b are bonded adhesively to the side surfaces of the lens holder 2 with the adhesive in the embodiments shown in FIGS. 13 to 19, naturally, the end surfaces of the first parts of the bodies 15a and 15b may be joined to the lens holder 2 by any suitable method other than a method which bonds the end surfaces of the first parts of the bodies 15a and 15b adhesively to the lens holder 2. For example, end portions of the first parts of the bodies 15a and 15b of elastic rubber may be fitted in holes formed in side surfaces of the lens holder 2 so that the first parts are immovable relative to the lens holder 2 in the tracking direction 106 and the tangential tilt direction 107.

Figure 20:
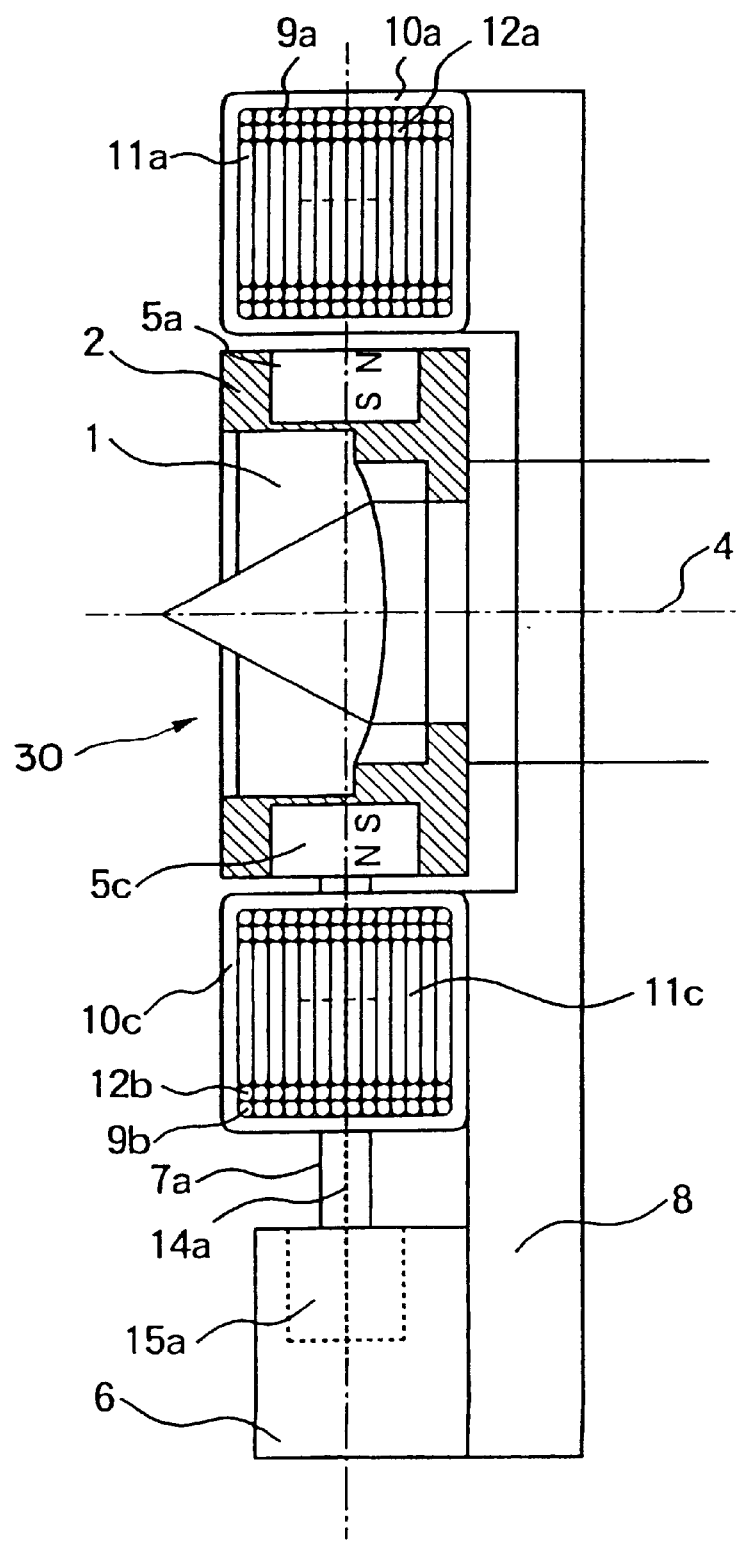
FIG. 20 is a schematic sectional view of different second parts of a pair of support members on the side of a support block.

An objective lens driving device in a fifth embodiment according to the present invention will be described with reference to FIGS. 20 and 21. The objective lens driving device in the fifth embodiment differs from the objective lens driving device in the foregoing embodiments in joints of a pair of support members 7a and 7b and a support block 6.

Figure 21:
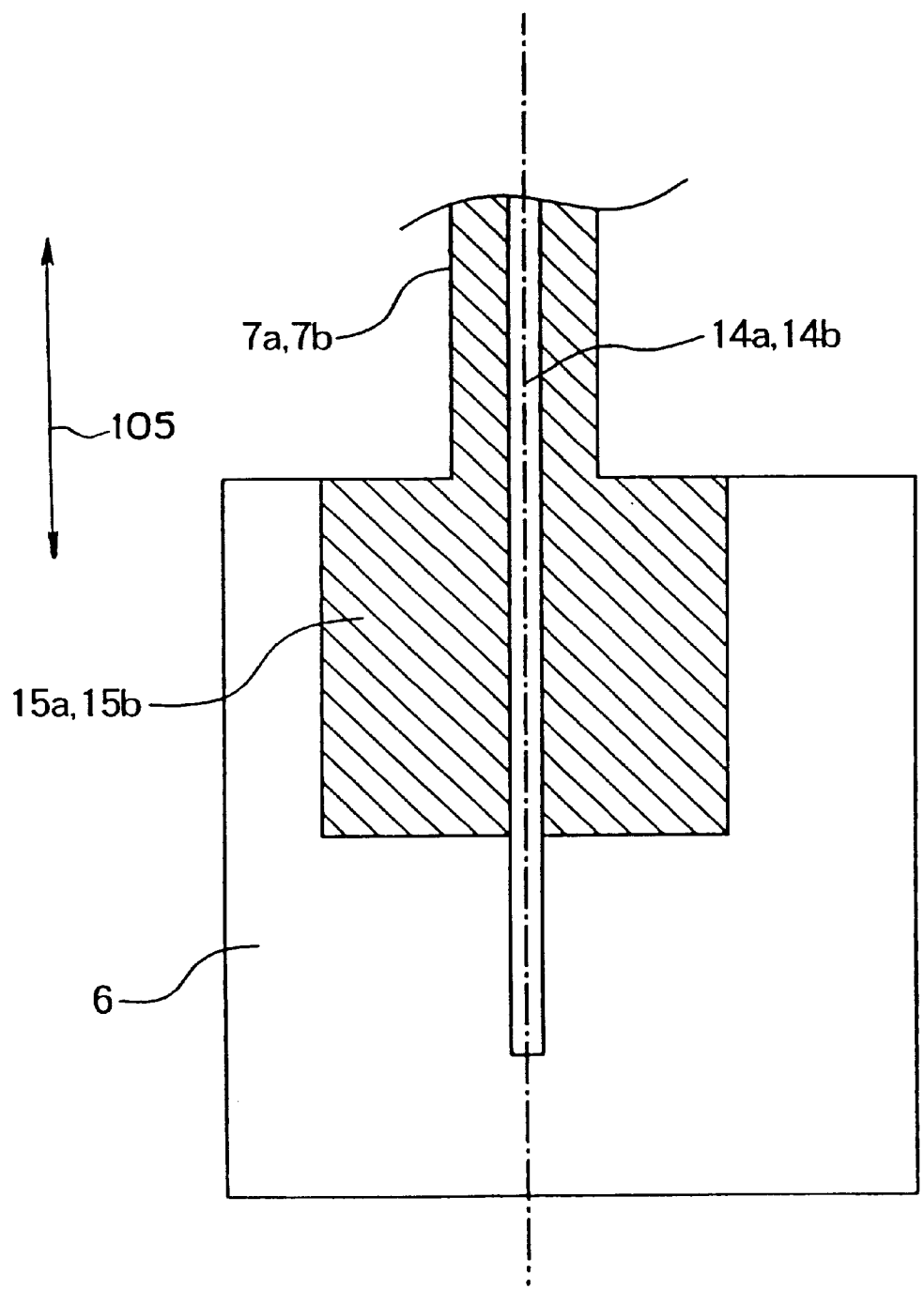
FIG. 21 is an enlarged sectional view of the second part of the support member on the side of the support block shown in FIG. 20.

Referring to FIG. 21, and end portion of a second part of a body 15a (15b) of the support member 7a (7b) is fixedly embedded in the support block 6, and an end portion of a wire 14a (14b) is fixedly stuck in the support block 6. This combination of the support block 6 and the support members 7a and 7b further enhances the damping effect and provides very satisfactory frequency characteristics with respect to directions of four axes.

An objective lens driving device in a sixth embodiment according to the present invention will be described with reference to FIGS. 22 to 24.

Figure 22:
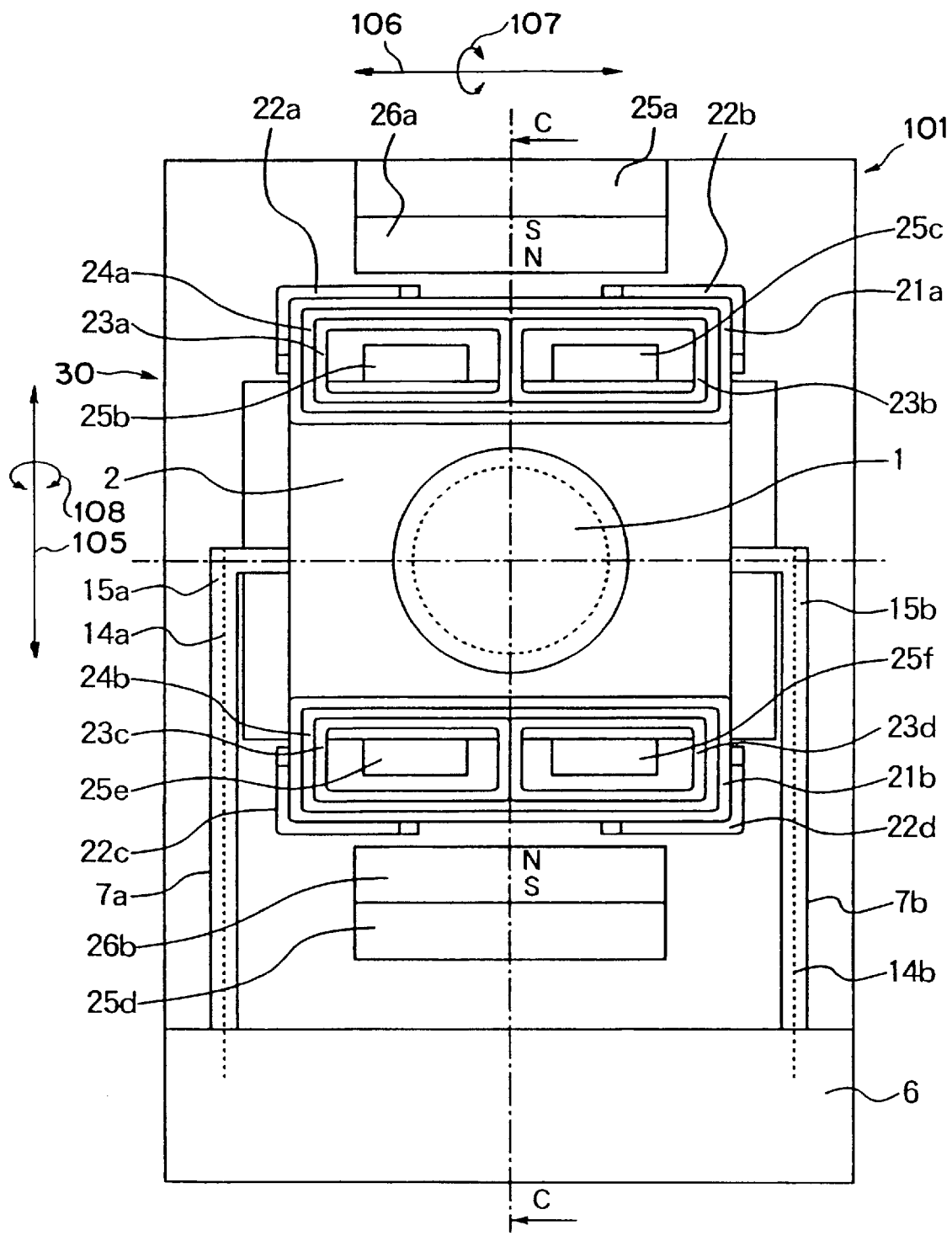
FIG. 22 is a schematic plan view of an objective lens driving device of a moving coil type.
Figure 23:
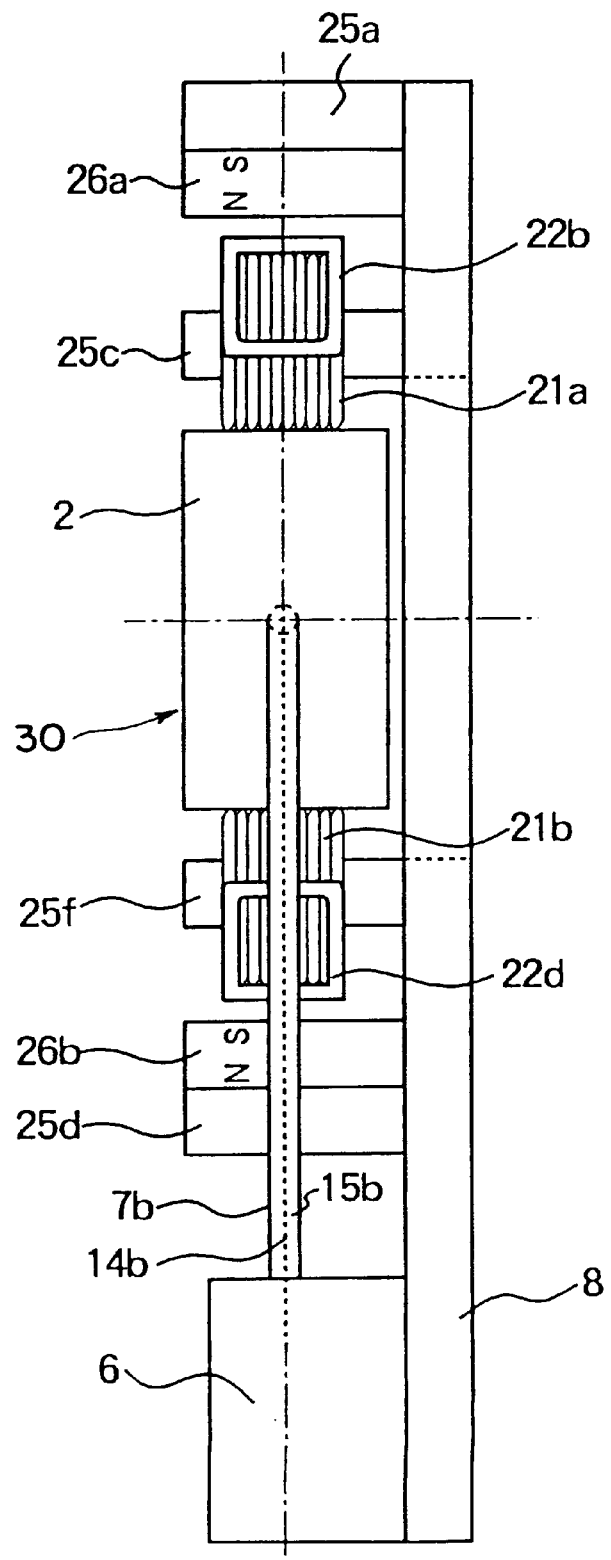
FIG. 23 is a schematic side view of the objective lens driving device of FIG. 22.
Figure 24:
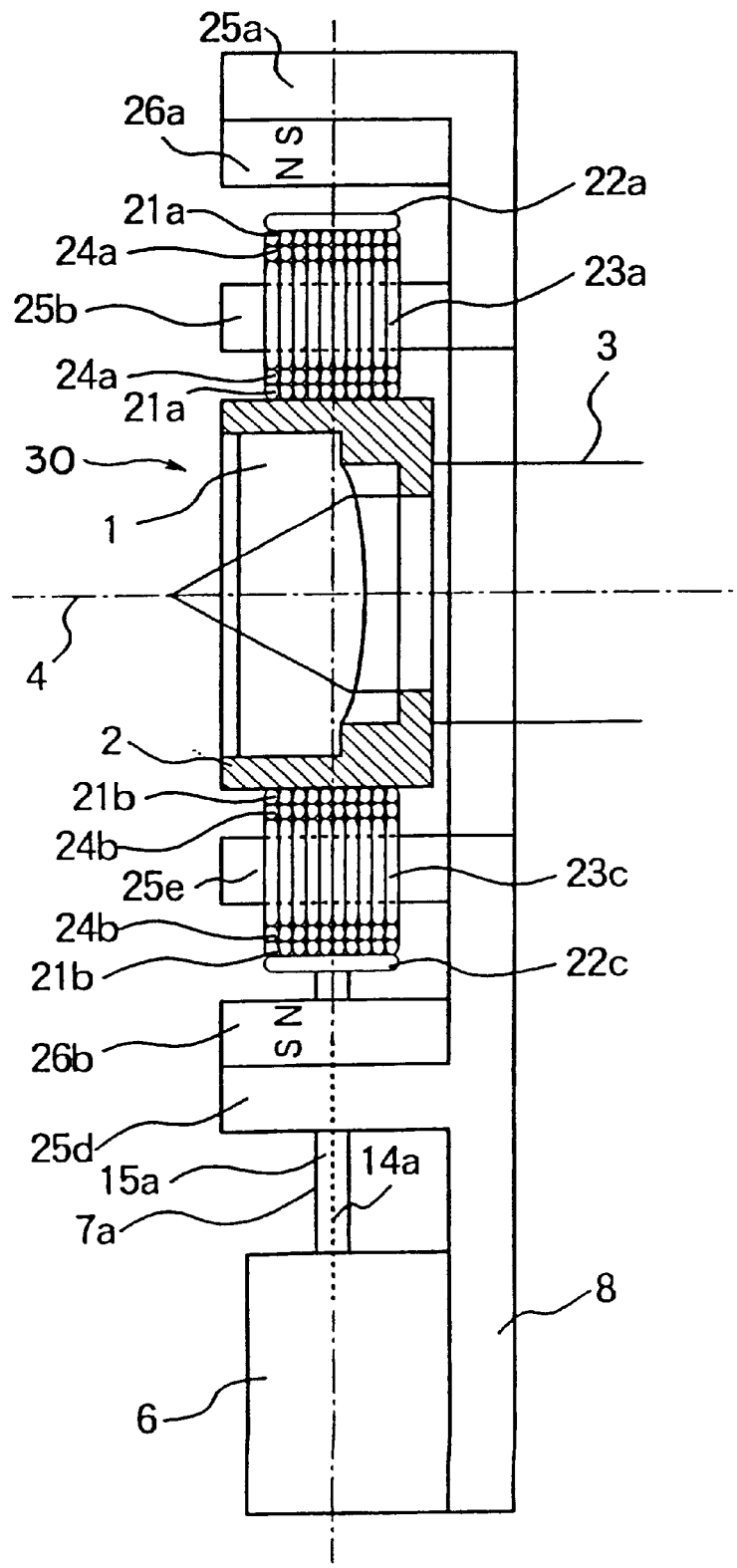
FIG. 24 is a schematic sectional view taken on line C—C in FIG. 22.

Referring to FIGS. 22 to 24, the objective lens driving device comprises a lens holder 2 holding an objective lens 1 for focusing a light beam 3 on an optical disk, focusing coils 21a and 21b attached to the lens holder 2, tracking coils 22a, 22b, 22c and 22d, radial tilt coils 23a, 23b, 23c and 23d, tangential tilt coils 24a and 24b, a pair of support members 7a and 7b for supporting the lens holder 2, a base block 8, magnets 26a and 26b mounted on the base block 8, and yokes 25a and 25b, 25c, 25d, 25e and 25f formed on the base block 8.

Each of the pair of support members 7a and 7b has a shape resembling the letter L, and has a first part and a second part extending perpendicularly to the first part. The support members 7a and 7b support the lens holder 2 so that the lens holder 2 can be translated in a focusing directions, namely, directions parallel to the beam axis 102a of a light beam 102, and tracking directions 106, and can be turned in radial tilt directions 108 and tangential tilt directions 107. Each of the pair of support members 7a and 7b have a first end connected to the lens holder 2 and a second end connected to a support block 6.

The magnets 26a and 26b, and the yokes 25a and 25b, 25c, 25d, 25e and 25f formed on the base block 8 are arranged to drive the lens holder 2 for translation in the focusing directions and the tracking directions 106, and for turning in the radial tilt directions 108 and the tangential tilt directions 107.

The magnet 25a is combined with the yokes 25a, 25b and 25c, and the magnet 25b is combined with the yokes 25d, 25e and 25f to form magnetic circuits. Currents are supplied individually to the focusing coils 21a and 21b, the tracking coils 22a, 22b, 22c and 22d, the radial tilt coils 23a, 23b, 23c and 23d, and the tangential tilt coils 24a and 24b to produce predetermined Lorentz forces in the focusing coils 21a and 21b, the tracking coils 22a, 22b, 22c and 22d, the radial tilt coils 23a, 23b, 23c and 23d, and the tangential tilt coils 24a and 24b to drive the lens holder 2 for translation along two axes and for turning about two axes. The objective lens driving device in this embodiment is of a moving coil type. Various modifications of the arrangement of the coils and the configuration of the magnetic circuits are possible.

In this objective lens driving device, the pair of support members 7a and 7b may be similar to any one of the pairs of support members shown in FIGS. 7 to 21. The effect of this objective lens driving device is the same as that of the foregoing objective lens driving devices of the moving magnet type.

Figure 25:
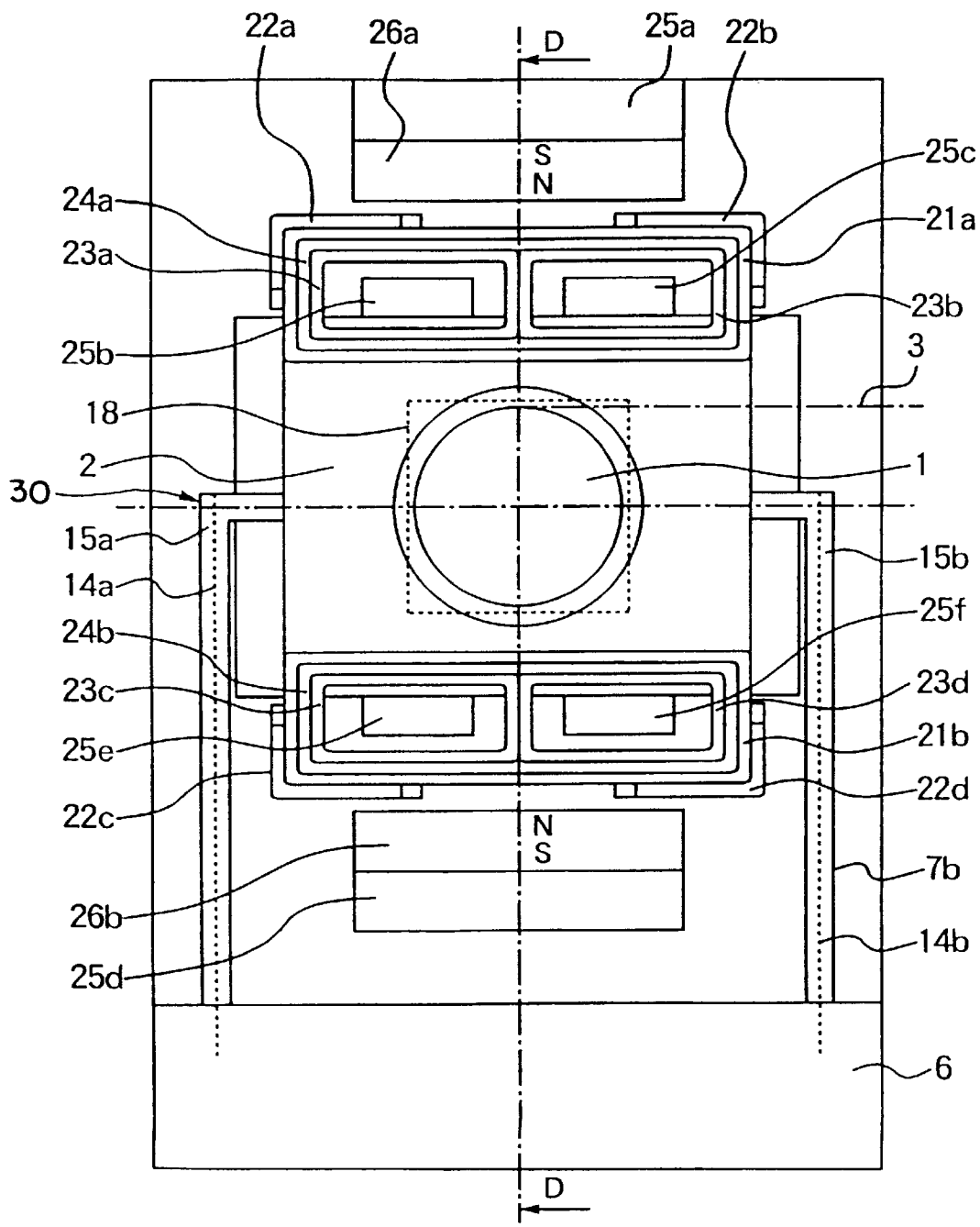
FIG. 25 is a schematic plan view of an objective lens driving device in a third embodiment according to the present invention.
Figure 26:
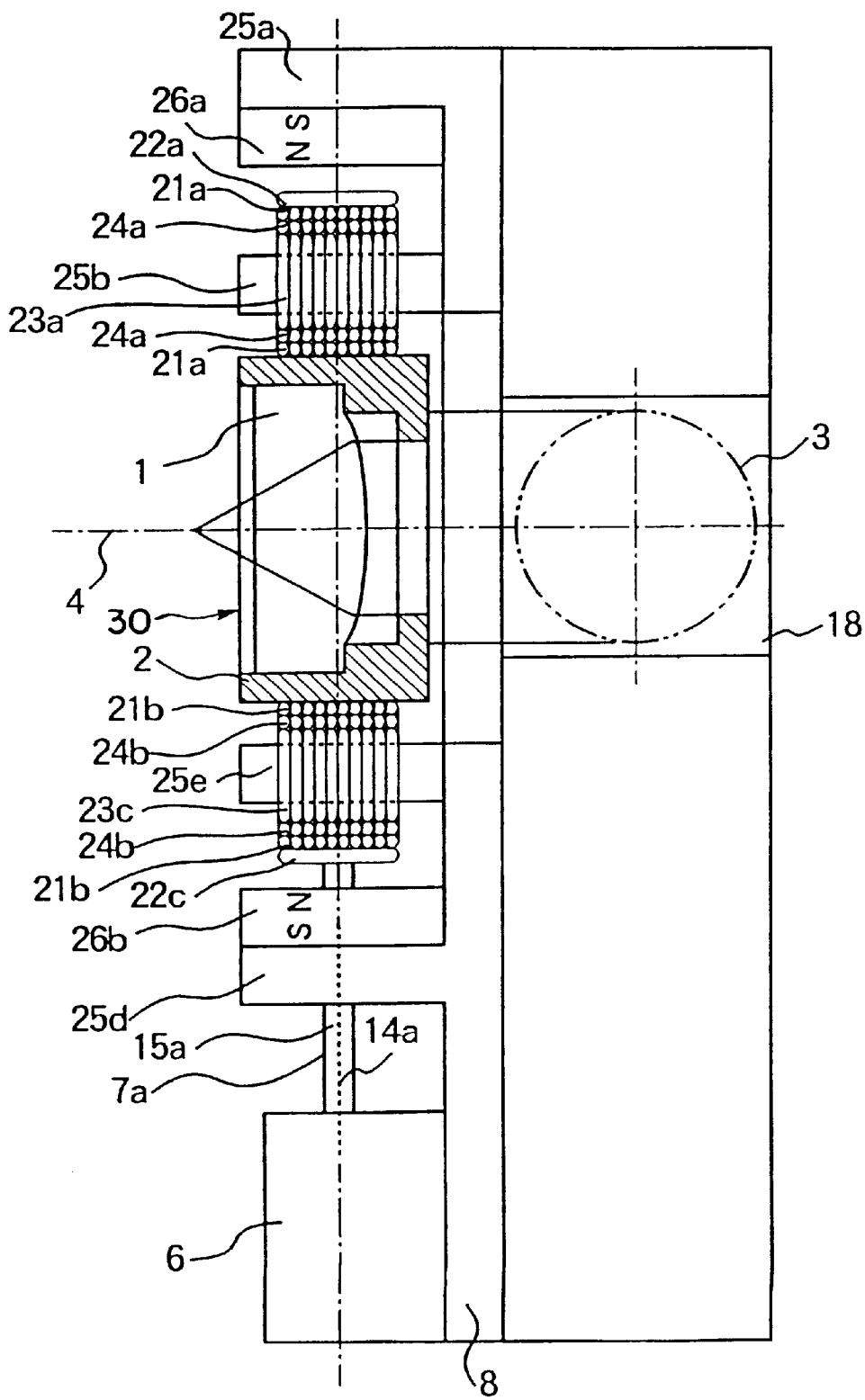
FIG. 26 is a schematic sectional view taken on line D—D in FIG. 25.

An objective lens driving device of a moving coil type in a seventh embodiment according to the present invention will be described hereinafter. FIG. 25 is a schematic plan view of the objective lens driving device in the seventh embodiment, and FIG. 26 is a schematic sectional view taken on line D—D in FIG. 25. Referring to FIGS. 25 and 26, an incident light beam 3 travels in a direction perpendicular to the optical axis 4 of an objective lens 1 and falls on a reflecting mirror 18, and the reflecting mirror 18 reflects the light beam 3 toward the objective lens lens 1. As is obvious from FIG. 26, the objective lens driving device can be built in a relatively thin construction.

In this objective lens driving device, joints of a lens holder 2 and first ends of a pair of support members 7a and 7b, the arrangement of wires 14a and 14b in the pair of support members 7a and 7b, and joints of second ends of the pair of support members 7a and 7b and a support block 6 may be the same as those in the foregoing embodiments.

An objective lens driving device in an eighth embodiment according to the present invention will be described hereinafter.

Figure 27:
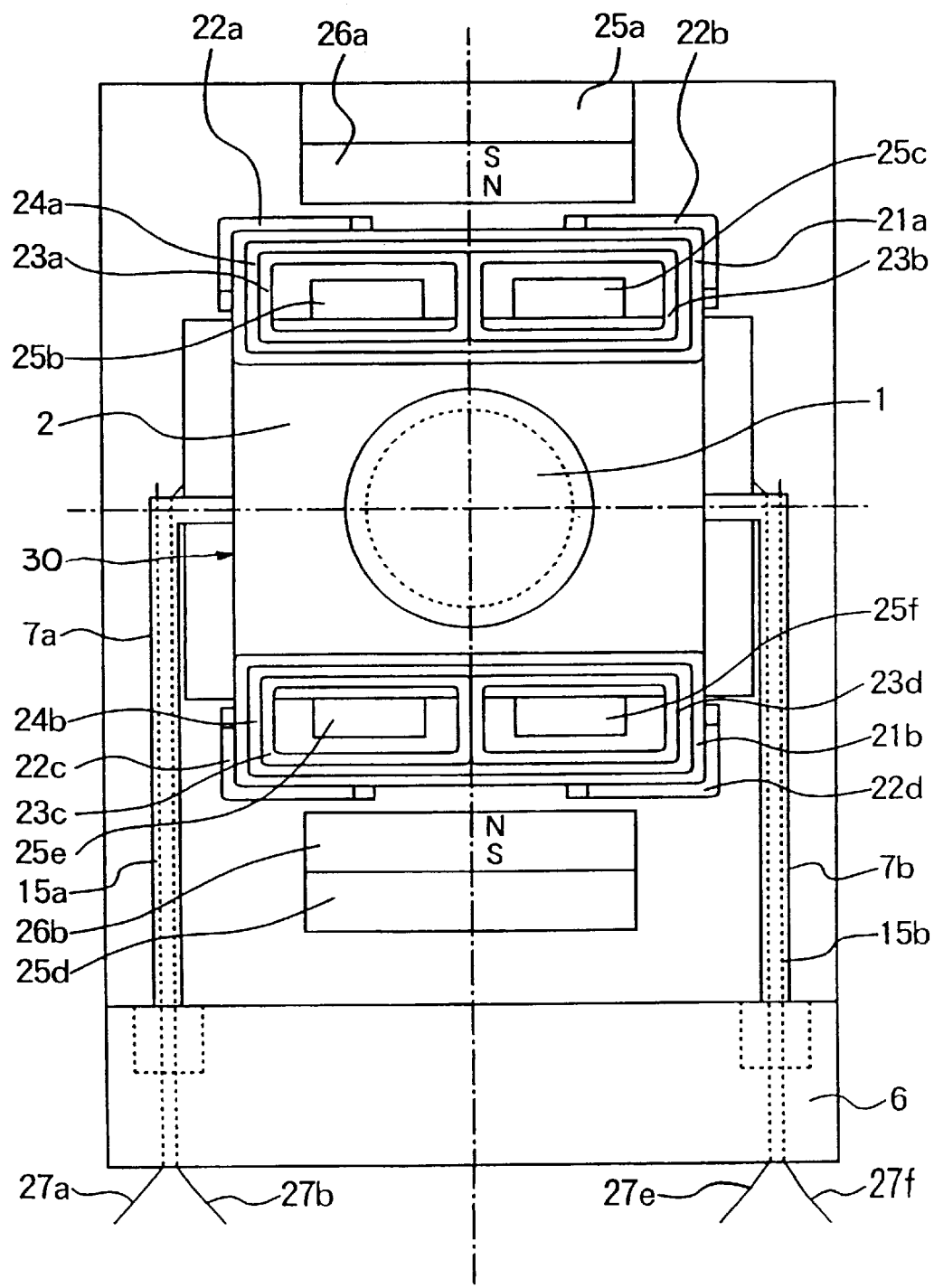
FIG. 27 is a schematic plan view of an objective lens driving device embodying the present invention provided with a pair of support members each provided internally with four wires.
Figure 28:
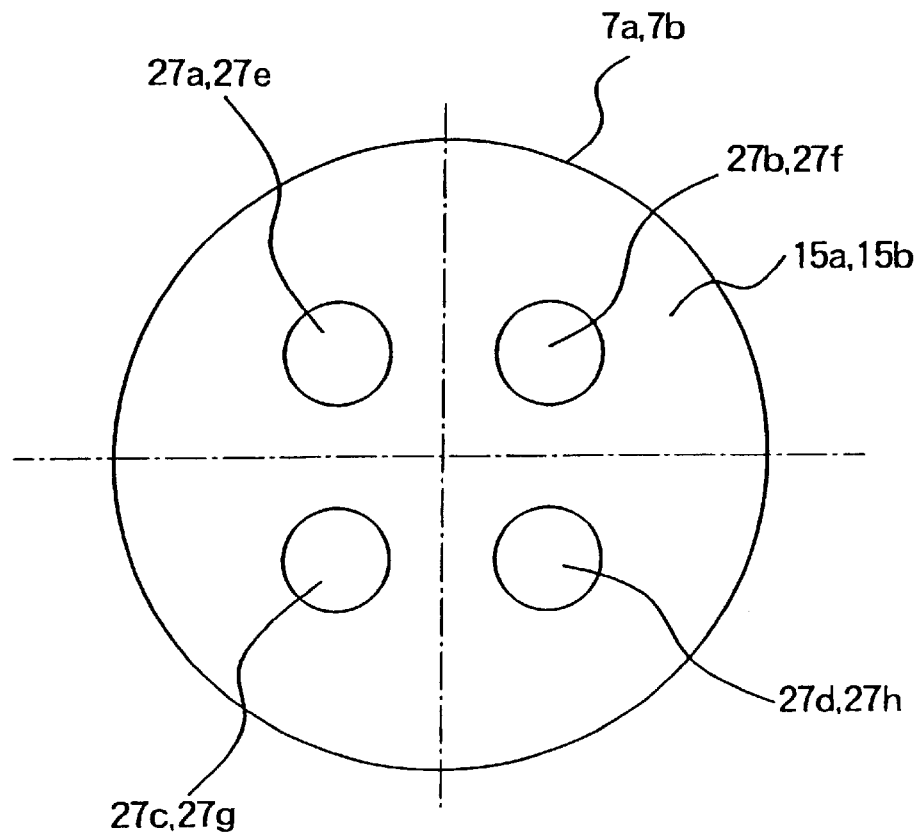
FIG. 28 is a sectional view of a support member shown in FIG. 27 provided with wires of a round cross section.
Figure 29:
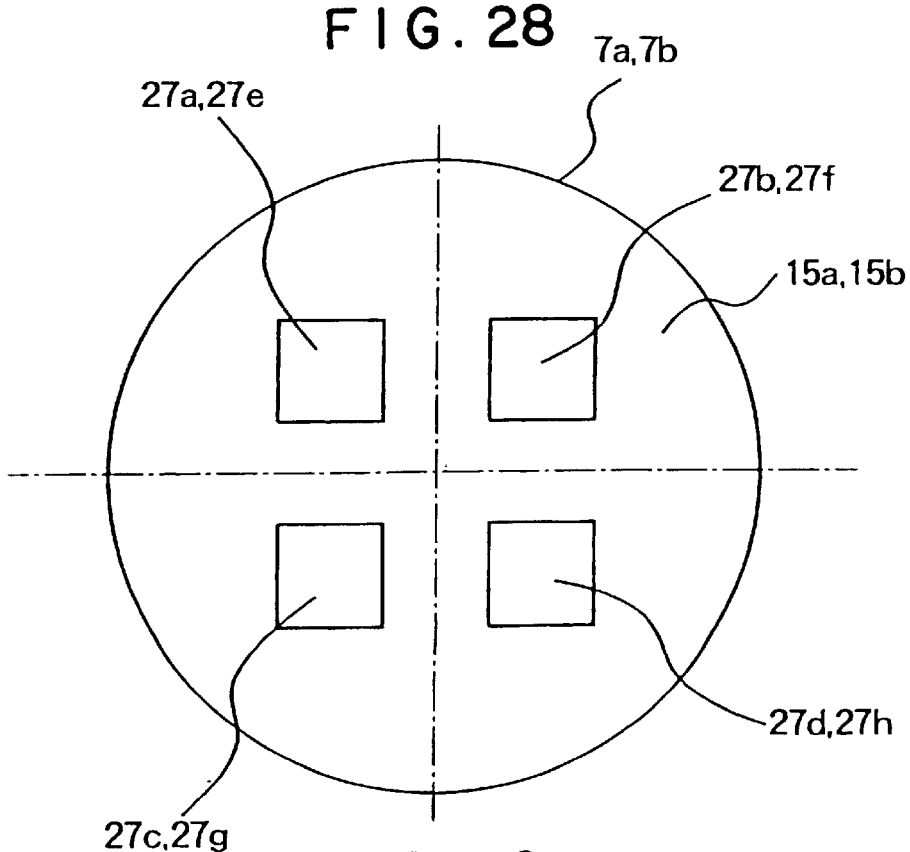
FIG. 29 is a sectional view of a support member shown in FIG. 27 provided with wires of a square cross section.

Referring to FIGS. 27 to 29, a pair of support members 7a and 7b are provided internally with four wires 27a, 27b, 27c and 27d, and four wires 27e, 27f, 27g and 27h, respectively. The wires 27a, 27b, 27c, 27d, 27e, 27f, 27g and 27h are arranged in the support members 7a and 7b, and have a cross section as shown in FIG. 28 or 29. The wires 27a, 27b, 27c, 27d, 27e, 27f, 27g and 27h have a circular cross section in FIG. 28, or the wires 27a, 27b, 27c, 27d, 27e, 27f, 27g and 27h have a square cross section. Naturally, there is no particular restriction on the sectional shape of the wires 27a, 27b, 27c, 27d, 27e, 27f, 27g and 27h.

The eight wires 27a, 27b, 27c, 27d, 27e, 27f, 27g and 27h arranged in the support members 7a and 7b can be used as lead wires for a plurality of coils. If the wires 27a, 27b, 27c, 27d, 27e, 27f, 27g and 27h are employed as lead wires for supplying current to the plurality of coils, any flexible cables for supplying current to the coils are not necessary.

In this embodiment, driving currents can be supplied through the eight wires 27a, 27b, 27c, 27d, 27e, 27f, 27g and 27h of the support members 7a and 7b to focusing coils 21a and 21b, tracking coils 22a, 22b, 22c and 22d, radial tilt coils 23a, 23b, 23c and 23d, and tangential tilt coils 24a and 24b, which are mounted on a lens holder 2.

Figure 30:
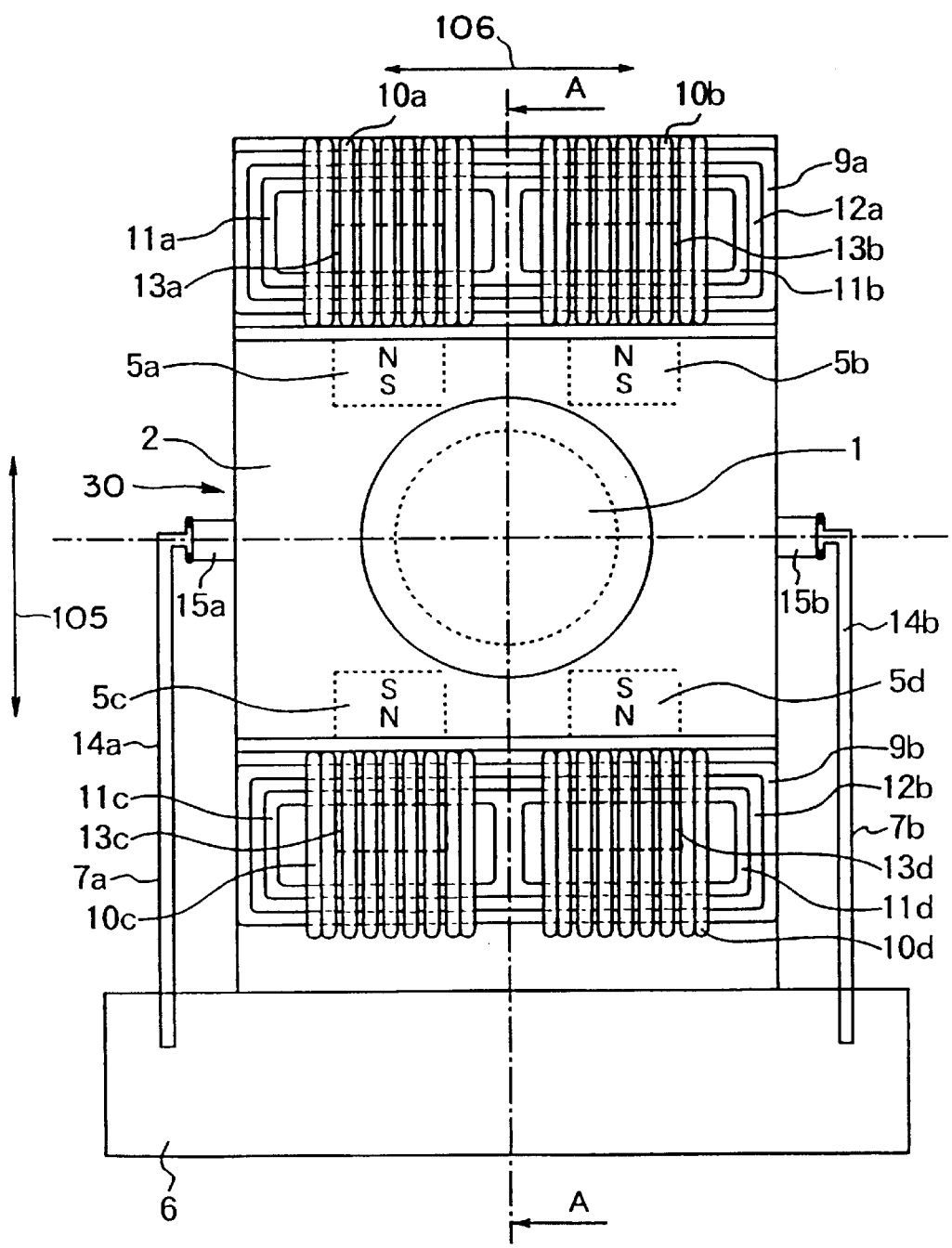
FIG. 30 is a schematic plan view of an objective lens driving device in a fourth embodiment according to the present invention.
Figure 31:
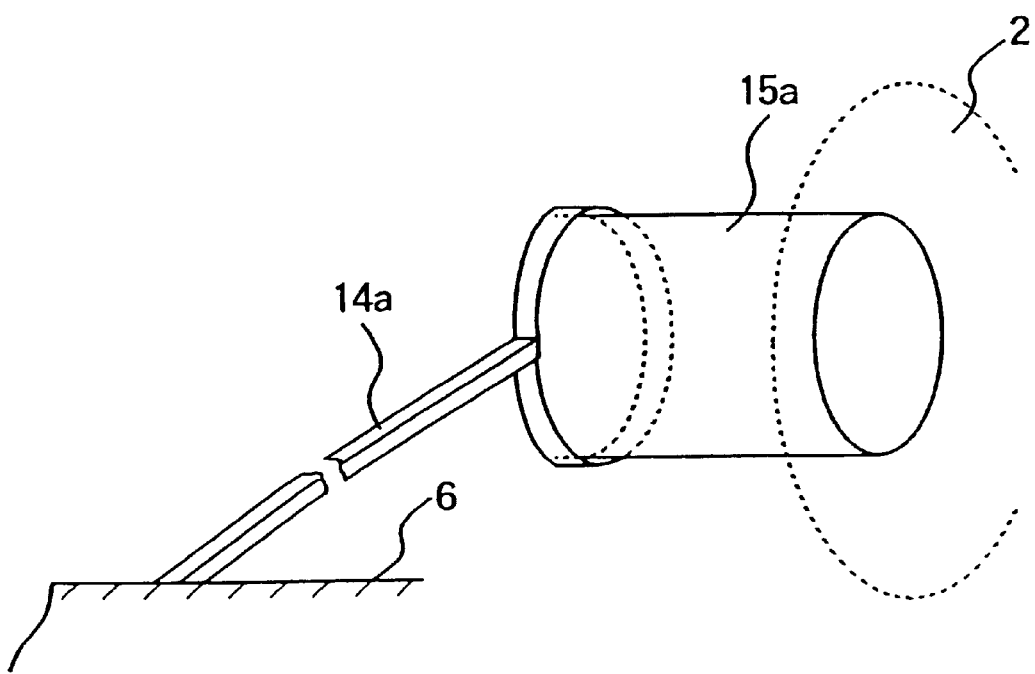
FIG. 31 is a schematic perspective view of a support member included in the objective lens driving device of FIG. 30.

The support members 7a and 7b may have first parts 15a and 15b made of elastic rubber and attached to the lens holder 2, and wires serving as second parts 14a and 14b and having ends connected to a support block 6 as shown in FIGS. 30 and 31. As shown in FIG. 31, the second parts 14a (14b) has a linear portion having a sectional shape of, for example, 100 μm square, and an annular portion connected to the free end of the linear portion and to the free end of the first part 15a (15b) of elastic rubber.

Modifications of the support devices of the objective lens driving devices in the foregoing embodiments will be described hereinafter with reference to FIGS. 32(a) to 32(d). Each of support device shown in FIGS. 32(a) to 32(d) has a pair of support members 122 and 124. The support members 122 and 124 have first bar-shaped parts 126 and 127 projecting from a support block 6, and second bar-shaped parts 128 and 129 joined perpendicularly to the free ends of the first bar-shaped parts 126 and 127, respectively. The torsional rigidity, namely, the rigidity resisting twisting in the tangential tilt direction, of the second bar-shaped parts 128 and 129 is relatively low, and the bending rigidity, namely, the rigidity resisting bending in the tangential tilt direction, of the first bar-shaped parts 126 and 127 is relatively high.

In the support device shown in FIG. 32(a), the second bar-shaped parts 128 and 129 have the shape of a coil spring and have a torsional rigidity with respect to the tangential tilt direction far lower than the bending rigidity of the first bar-shaped parts 126 and 127.

In the support device shown in FIG. 32(b), necks are formed in the second bar-shaped parts 128 and 129, respectively, so that the torsional rigidity with respect to the tangential tilt direction of the second bar-shaped parts 128 and 129 is far lower than the bending rigidity of the first bar-shaped parts 126 and 127.

In the support device shown in FIG. 32(c), the second bar-shaped parts 128 and 129 have a bifurcate shape and have a torsional rigidity with respect to the tangential tilt direction far lower than the bending rigidity of the first bar-shaped parts 126 and 127.

In the support device shown in FIG. 32(d), the second bar-shaped parts 128 and 129 are formed in a sectional area far smaller than that of the first bar-shaped parts 126 and 127 so that the torsional rigidity with respect to the tangential tilt direction of the second bar-shaped parts 128 and 129 is far lower than the bending rigidity of the first bar-shaped parts 126 and 127.

The support members 122 and 124 shown in FIGS. 32(a), 32(b), 32(c) or 32(d) may be metal wires or plastic wires. Therefore, the support members 122 and 124 have a simple structure and can be easily manufactured.

Figure 33A:
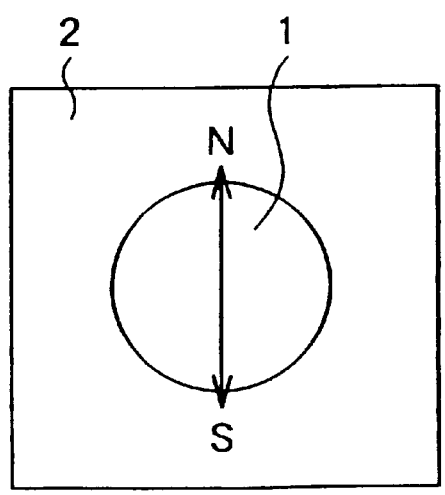
FIGS. 33(*a*) and 33(*b*) are schematic plan views of magnetized lens holders.
Figure 33B:
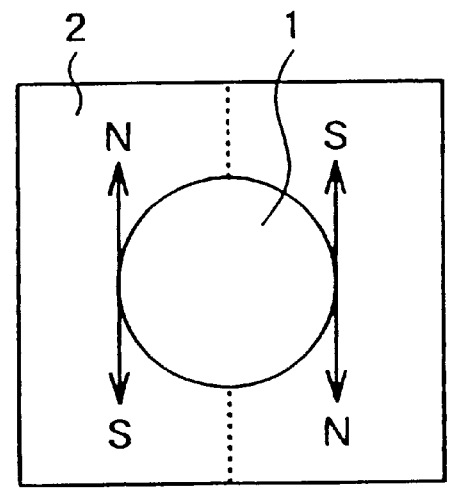

FIGS. 33(a) and 33(b) show lens holders in modifications of the lens holders 2 employed in the objective lens driving devices in the foregoing embodiments. The lens holder 2 shown in FIG. 33(a) is magnetized in a single magnet, and the lens holder 2 shown in FIG. 33(b) is magnetized in two magnets. It goes without saying that the magnetized lens holders 2 are able to form magnetic circuits in combination with driving coils and magnetic blocks. The lens holders 2 may be made of a magnetic plastic material. If the magnetized lens holder 2 is employed, any additional magnets are unnecessary and the objective lens driving device can be built in a very compact construction.

As is apparent from the foregoing description, the objective lens driving device according to the present invention is capable of achieving tilt correction and of highly accurately and quickly correcting the tilt of the objective lens relative to the signal recording surface of the optical disk so that the comatic aberration of the spot of the light beam on the signal recording surface of the optical disk can be reduced.

Although the invention has been described in its preferred embodiments, obviously many changes and variations are possible therein. It is therefore to be understood that the present invention may be practiced otherwise than as specifically described herein without departing from the scope and spirit thereof.

What is claimed is:

1. An objective lens support device used in correcting a position of an objective lens in a focusing direction and in a tracking direction and further correcting a position of the objective lens in at least one of a tangential tilt direction and a radial tilt direction, the objective lens support device comprising:

a lens holder constructed and arranged to hold the objective lens;

a pair of support members supporting said lens holder; and a support block supporting the pair of support members;

the pair of support members being disposed in a plane substantially perpendicular to an optical axis of the objective lens, each of the pair of support members having a first part and a second part, the first part having a first end and a second end connected to the lens holder, the second part having a first end connected the first end of the first part and a second end connected to the support block, the rotary rigidity of the first part in the tangential tilt direction being smaller than the rotary rigidity of the second part in the tangential tilt direction.

2. An objective lens support device used in correcting a position of an objective lens in a focusing direction and in a tracking direction and further correcting a position of the objective lens in at least one of a tangential tilt direction and a radial tilt direction, the objective lens support device comprising:

a lens holder constructed and arranged to hold the objective lens;

a pair of support members supporting said lens holder; and a support block supporting the pair of support members; and a driver constructed and arranged to drive the lens holder;

the pair of support members being disposed in a plane substantially perpendicular to an optical axis of the objective lens, each of the pair of support members having a first part and a second part, the first part having a first end and a second end connected to the lens holder, the second part having a first end connected the first end of the first part and a second end connected to the support block, the rotary rigidity of the first part in the tangential tilt direction being smaller than the rotary rigidity of the second part in the tangential tilt direction.

3. An objective lens driving device according to claim 2, wherein the second part of each of the pair of support members is a member having a rigidity higher than that of a member serving as the first part of the same support member.

4. An objective lens driving device according to claim 2, wherein the first part of each of the pair of support members comprises an elastic member, and the second part of each of the pair of support members comprises a flexible member.

5. An objective lens driving device according to claim 2, wherein the first part of each of the pair of support members comprises an elastic member, and the second part of each of the pair of support members comprises a composite member comprising an elastic member, and a flexible member.

6. An objective lens driving device according to claim 2, wherein the drive includes a magnet attached to the lens holder, and a coil attached to the support block.

7. An objective lens driving device according to claim 2, wherein the driver has a magnet attached to the support block, and a coil attached to the lens holder.

8. An objective lens driving device according to claim 2, wherein a movable unit including at least the objective lens has its center of gravity on the plane perpendicular to the optical axis of the objective lens, and on the optical axis of the objective lens.

9. An objective lens driving device according to claim 2, wherein the driver drives the objective lens for turning about two perpendicularly intersecting axes included in the plane perpendicular to the optical axis of the objective lens.

10. An objective lens driving device according to claim 2, wherein the driver comprises driving coils, and at least one magnetic circuit which comprises at least one of a magnet and a magnetic block.

11. An objective lens driving device according to claim 10, wherein each of the pair of support members has a second bar-shaped member forming the second part and extended from the support block, and a first bar-shaped member forming the first part; and a magnetic force exerted by the magnetic circuit is exerted on each of the second bar-shaped members so that the second bar-shaped members are extended substantially longitudinally.

12. An objective lens driving device according to claim 2, wherein the first part of each of the pair of support members is an elastic rubber, and the second part of each of the pair of support members is a metal rod or a plastic rod.

* * * * *